United States Patent
Kung et al.

(10) Patent No.: US 11,234,244 B2
(45) Date of Patent: Jan. 25, 2022

(54) METHOD AND APPARATUS FOR PERFORMING RANDOM ACCESS RESOURCE SELECTION IN NEW RADIO ACCESS TECHNOLOGY-UNLICENSED (NR-U) CELLS IN A WIRELESS COMMUNICATION SYSTEM

(71) Applicant: ASUSTek Computer Inc., Taipei (TW)

(72) Inventors: Yi-Hsuan Kung, Taipei (TW); Yu-Hsuan Guo, Taipei (TW); Jia-Hong Liou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 44 days.

(21) Appl. No.: 16/460,239

(22) Filed: Jul. 2, 2019

(65) Prior Publication Data
US 2020/0015236 A1  Jan. 9, 2020

Related U.S. Application Data

(60) Provisional application No. 62/694,192, filed on Jul. 5, 2018.

(51) Int. Cl.
| | |
|---|---|
| *H04W 72/08* | (2009.01) |
| *H04B 17/318* | (2015.01) |
| *H04L 5/00* | (2006.01) |
| *H04W 72/04* | (2009.01) |
| *H04W 74/08* | (2009.01) |

(52) U.S. Cl.
CPC ........ *H04W 72/082* (2013.01); *H04B 17/318* (2015.01); *H04L 5/0048* (2013.01); *H04W 72/0413* (2013.01); *H04W 74/0833* (2013.01)

(58) Field of Classification Search
CPC ..... H04W 72/04; H04W 72/06; H04W 72/13; H04W 72/082; H04W 72/085; H04W 74/0833; H04W 74/0866; H04W 74/006; H04W 74/004; H04W 74/0875; H04W 52/36; H04W 52/325; H04W 52/50; H04W 16/14; H04B 17/318; H04B 17/336; H04B 7/0695; H04B 7/04; H04L 5/0048; H04L 5/0035; H04L 5/006; H04L 5/0023; H04L 5/001; H04L 27/2601
See application file for complete search history.

(56) References Cited

U.S. PATENT DOCUMENTS

| | | | |
|---|---|---|---|
| 2016/0037550 A1* | 2/2016 | Barabell | H04W 72/046 455/450 |
| 2016/0029358 A1 | 6/2016 | Hou | |
| 2018/0279286 A1* | 9/2018 | Akoum | H04W 72/046 |

(Continued)

*Primary Examiner* — Chi H Pham
*Assistant Examiner* — Vladislav Y Agureyev
(74) *Attorney, Agent, or Firm* — Cooper Legal Group, LLC

(57) ABSTRACT

A method and apparatus are disclosed. In an example from the perspective of a User Equipment (UE), a random access procedure in a cell controlled by a network node is initiated. A downlink signal is selected from amongst configured downlink signals. A measured Reference Signal Received Power (RSRP) value associated with the downlink signal satisfies a first criterion associated with a first threshold. A measurement result associated with the downlink signal satisfies a second criterion associated with a second threshold. A random access preamble transmission of the random access procedure is performed on a Physical Random Access Channel (PRACH) occasion associated with the downlink signal.

20 Claims, 14 Drawing Sheets

(56) References Cited

U.S. PATENT DOCUMENTS

| | | | |
|---|---|---|---|
| 2018/0302817 A1* | 10/2018 | Teshima | H04W 72/04 |
| 2019/0053314 A1* | 2/2019 | Zhou | H04B 7/0695 |
| 2019/0104549 A1* | 4/2019 | Deng | H04B 7/0617 |
| 2019/0208547 A1* | 7/2019 | Koskela | H04W 72/0446 |
| 2019/0215870 A1* | 7/2019 | Babaei | H04W 72/042 |
| 2019/0215888 A1* | 7/2019 | Cirik | H04B 7/0695 |
| 2019/0306909 A1* | 10/2019 | Zhou | H04B 7/08 |
| 2019/0357092 A1* | 11/2019 | Jung | H04W 36/0055 |
| 2020/0137821 A1* | 4/2020 | Cirik | H04B 17/327 |
| 2020/0296765 A1* | 9/2020 | Kim | H04W 56/001 |

* cited by examiner

500 →

| OFDM signal indication SS-RSSI-MeasurementSymbolConfig | Symbol indexes |
|---|---|
| 0 | {0,1} |
| 1 | {0,1,2,..,10,11} |
| 2 | {0,1,2,..., 5} |
| 3 | {0,1,2,..., 7} |

| Channel Access Priority Class ($p$) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3,7} |
| 2 | 1 | 7 | 15 | 3 ms | {7,15} |
| 3 | 3 | 15 | 63 | 8 or 10 ms | {15,31,63} |
| 4 | 7 | 15 | 1023 | 8 or 10 ms | {15,31,63,127,255,511,1023} |

| Channel Access Priority Class ($p$) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3,7} |
| 2 | 2 | 7 | 15 | 4 ms | {7,15} |
| 3 | 3 | 15 | 1023 | 6ms or 10 ms | {15,31,63,127,255,511,1023} |
| 4 | 7 | 15 | 1023 | 6ms or 10 ms | {15,31,63,127,255,511,1023} |

| Channel Access Priority | QCI |
|---|---|
| 1 | 1, 3, 5, 65, 66, 69, 70 |
| 2 | 2, 7 |
| 3 | 4, 6, 8, 9 |
| 4 | - |

FIG. 8

METHOD AND APPARATUS FOR PERFORMING RANDOM ACCESS RESOURCE SELECTION IN NEW RADIO ACCESS TECHNOLOGY-UNLICENSED (NR-U) CELLS IN A WIRELESS COMMUNICATION SYSTEM

CROSS-REFERENCE TO RELATED APPLICATIONS

The present Application claims the benefit of U.S. Provisional Patent Application Ser. No. 62/694,192 filed on Jul. 5, 2018, the entire disclosure of which is incorporated herein in its entirety by reference.

FIELD

This disclosure generally relates to wireless communication networks, and more particularly, to a method and apparatus for performing Random Access resource selection in New Radio Access Technology-unlicensed (NR-U) cells in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), a random access procedure in a cell controlled by a network node is initiated. A downlink signal is selected from amongst configured downlink signals. A measured Reference Signal Received Power (RSRP) value associated with the downlink signal satisfies a first criterion associated with a first threshold. A measurement result associated with the downlink signal satisfies a second criterion associated with a second threshold. A random access preamble transmission of the random access procedure is performed on a Physical Random Access Channel (PRACH) occasion associated with the downlink signal.

BRIEF DESCRIPTION OF THE DRAWINGS

FIG. 5 illustrates a table associated with New Radio Access Technology (NR) carrier Received Signal Strength Indicator (RSSI) measurement symbols.

FIG. 6 illustrates a table associated with channel access priority classes.

FIG. 7 illustrates a table associated with channel access priority classes.

FIG. 8 illustrates a table associated with mapping between channel access priority classes and Quality of Service (QoS) Class Identifiers (QCIs).

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G or some other modulation techniques.

In particular, the exemplary wireless communication systems devices described below may be designed to support one or more standards such as the standard offered by a consortium named "3rd Generation Partnership Project" referred to herein as 3GPP, including: RP-172021, "Revised SID on NR-based Access to Unlicensed Spectrum"; 3GPP TS 38.215 V15.2.0, "Physical layer measurements"; 3GPP TS 36.213 V15.1.0, "Physical layer procedures"; 3GPP TS 36.300 V15.1.0, "Overall description"; 3GPP TS 38.321 V15.2.0, "Medium Access Control (MAC) protocol specification"; 3GPP TS 38.331 V15.2.0, "Radio Resource Control (RRC) protocol specification"; R1-1716941, "RAN1 #90 meeting report"; R2-1801702, "RAN2 #AH-1801 meeting report"; 3GPP RAN2 #102 chairman notes. The standards and documents listed above are hereby expressly incorporated by reference in their entirety.

Figure 1:
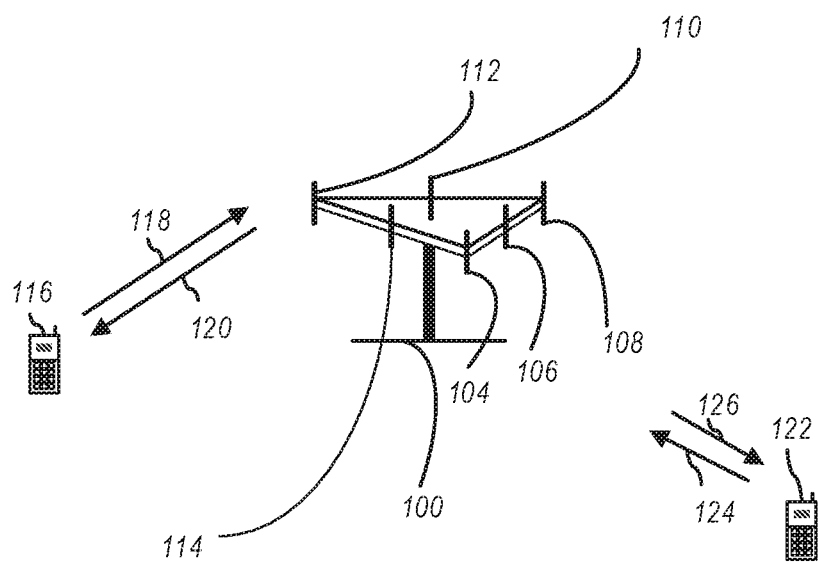
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
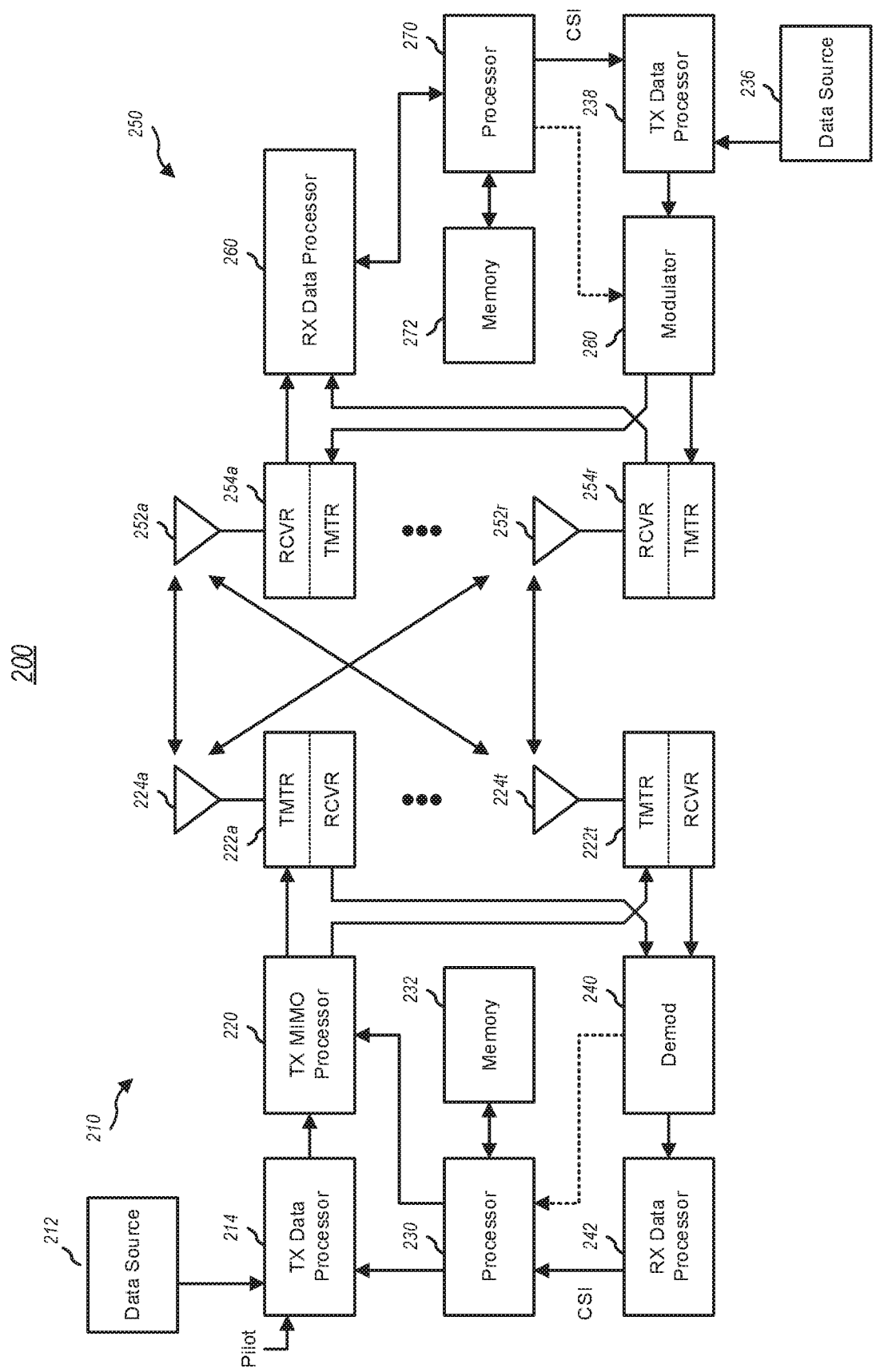
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which pre-coding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
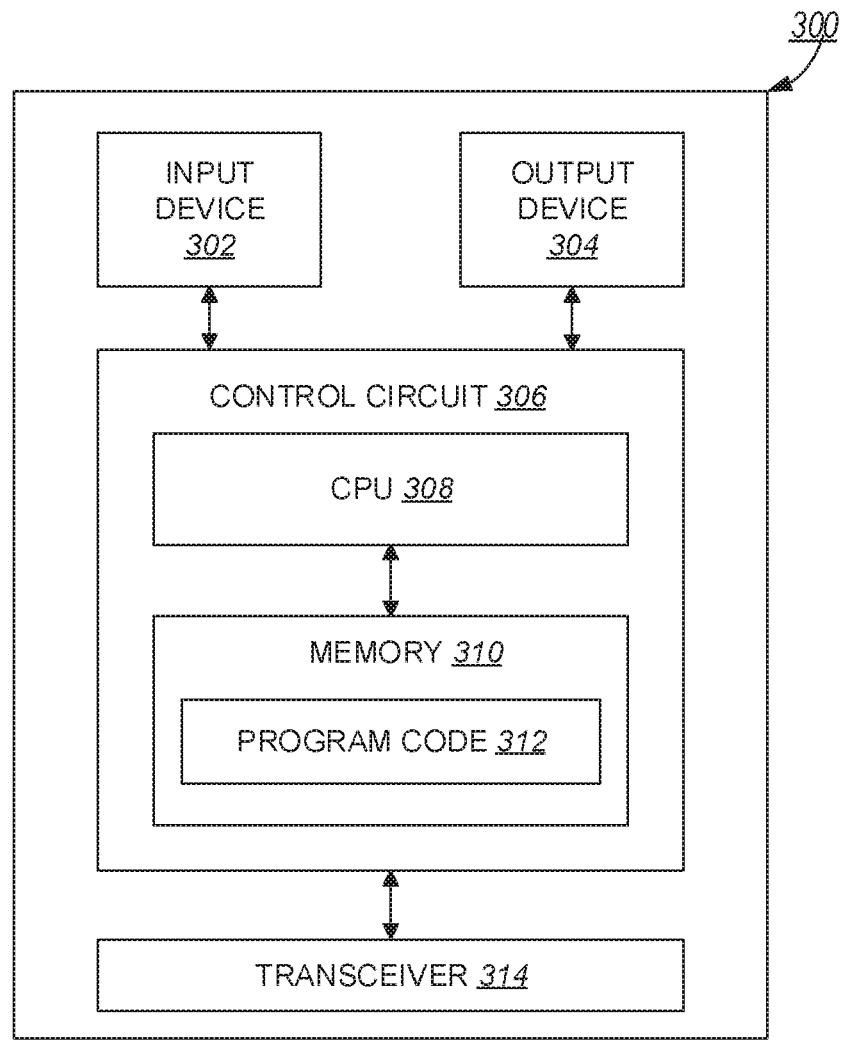
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
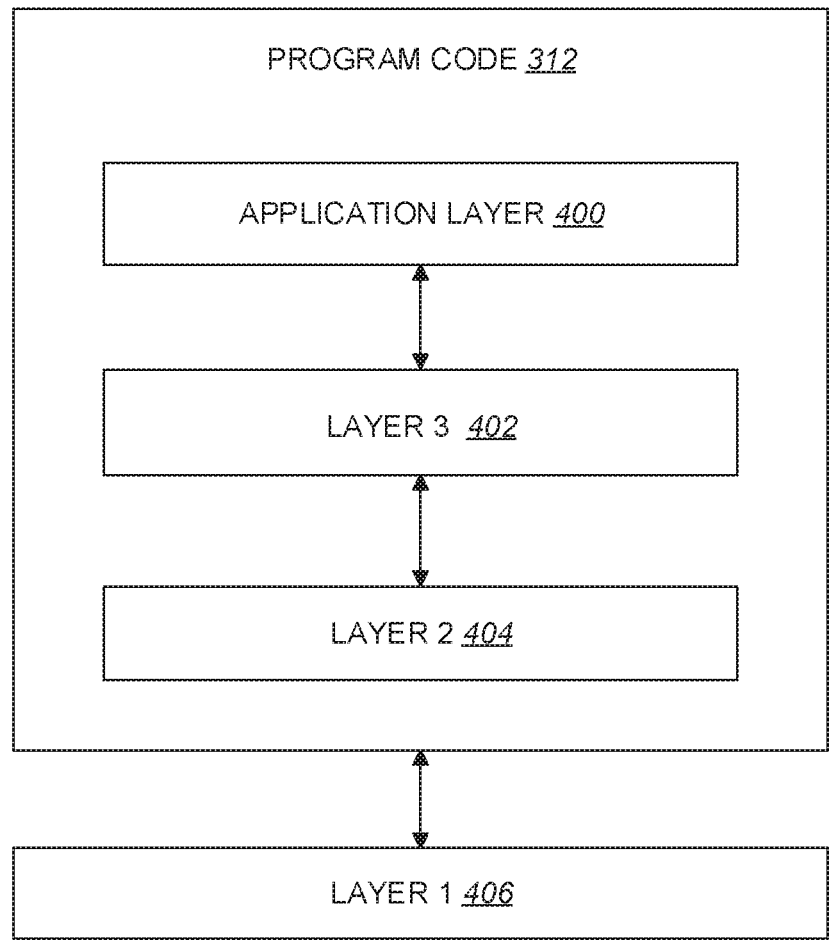
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

3GPP RP-172021 and 3GPPRAN #77 provide information associated with Radio Access Technology (RAT) and/or New RAT (NR). NR-based unlicensed access design is configured to allow fair coexistence across RATs and within NR-based systems operating in an unlicensed spectrum associated with NR-unlicensed (NR-U) (e.g., 5G NR unlicensed spectrum). One or more Radio Access Networks (RANs) (e.g., RAN1, RAN2 and/or RAN4) is associated with an unlicensed spectrum. NR-based operation in the unlicensed spectrum is associated with physical channels inheriting choices of duplex mode, waveform, carrier bandwidth, subcarrier spacing, frame structure, and/or physical layer design and/or avoiding unnecessary divergence with decisions made in an NR Work Item (WI). In some examples, unlicensed bands below and/or above 6 GHz, and/or unlicensed bands up to 52.6 GHz is considered. In some examples, unlicensed bands above 52.6 GHz is considered to the extent that waveform design principles remain unchanged with respect to below 52.6 GHz bands. In some examples, similar forward compatibility principles made in the NR WI is considered.

In some examples, NR-based operation in the unlicensed spectrum is associated with initial access, channel access, scheduling, Hybrid Automatic Repeat Request (HARQ) and/or mobility including connected operation, inactive operation, idle mode operation and/or radio-link monitoring and/or failure. In some examples, NR-based operation in the unlicensed spectrum is associated with coexistence methods associated with NR-based operation in the unlicensed spectrum and/or LTE-based License Assisted Access (LAA) and/or with one or more RATs in accordance with regulatory requirements in bands (e.g., 5 GHz, 37 GHz, 60 GHz). Coexistence methods defined for a 5 GHz band in LTE-based LAA context is assumed as a baseline for 5 GHz operation. Enhancements in 5 GHz over these methods are not precluded. NR-based operation in the unlicensed spectrum should not impact deployed Wi-Fi services (data, video and voice services) more than an additional Wi-Fi network on a same carrier.

In some examples, one or more NR-based LAA cells connect with an LTE and/or NR anchor cell operating in a licensed spectrum. Linking between a Primary Cell (PCell) (e.g., LTE and/or NR licensed Component Carriers (CCs)) and a Secondary Cell (SCell) (e.g., NR unlicensed CCs) is performed using one or more techniques in accordance with the NR WI.

An NR-based cell operating standalone (e.g., in standalone mode) in the unlicensed spectrum may be connected to a 5G-Core Network (5G-CN) with priority on frequency bands above 6 GHz (e.g., for private network deployments). In some examples, connection and/or security management is integrated (on a RAN level) with Evolved Universal Mobile Telecommunications System (UMTS) Terrestrial Radio Access Network (E-UTRAN), Next Generation (NG) RAN architecture and/or FG CN architecture (e.g., service continuity requirements for users mobbing between cells of licensed and/or unlicensed frequency bands, liaising with SA2 (e.g., subgroup Architecture of Service and System Aspects) as required).

3GPP TS 38.215 provides information associated with a UE measurement quantity, Synchronization Signal (SS) Reference Signal Received Power (RSRP) (SS-RSRP), Channel State Information (CSI) RSRP (CSI-RSRP), SS Reference Signal Received Quality (RSRQ) (SS-RSRQ), SS Signal-to-Noise and Interference Ratio (SINR) (SS-SINR) and/or CSI-SINR. A UE measurement quantity is provided. The UE measurement quantity is applicable for one or more parameters and/or states, such as RRC_IDLE, RRC_INACTIVE and/or RRC_CONNECTED. Intra-frequency is appended to a Radio Resource Control (RRC) state. For example, it is possible to perform the UE measurement quantity in a corresponding RRC state on an intra-frequency cell. In some examples, inter-frequency is appended to the RRC state. For example, it is possible to perform the UE measurement quantity in the corresponding RRC state on an inter-frequency cell. In some examples, inter-RAT is appended to the RRC state. For example, it is possible to perform the UE measurement quantity in the corresponding RRC state on an inter-RAT cell.

SS-RSRP is defined as a linear average over power contributions (e.g., in [W]) of resource elements that carry secondary SSs. One or more measurement time resources for SS-RSRP are confined within a SS/Physical Broadcast Channel (PBCH) Block Measurement Time Configuration (SMTC) window duration. If an SS-RSRP is used for L1-RSRP as configured by one or more reporting configurations, the one or more measurement time resources restriction by the SMTC window duration is not applicable.

SSs is used for SS-RSRP determination demodulation reference signals for PBCH and/or CSI reference signals is used (in addition to SSs if indicated by higher layers). SS-RSRP using a demodulation reference signal for a PBCH and/or CSI reference signal is measured by linear averaging over power contributions of resource elements that carry corresponding reference signals taking into account power scaling for the reference signals. If SS-RSRP is not used for L1-RSRP, the additional use of CSI reference signals for SS-RSRP determination is not applicable.

SS-RSRP is measured among reference signals corresponding to SS/PBCH blocks with a corresponding SS/PBCH block index and a corresponding physical-layer cell identity. If SS-RSRP is not used for L1-RSRP and/or higher-layers indicate one or more SS/PBCH blocks for performing SS-RSRP measurements, then SS-RSRP is measured using the one or more SS/PBCH blocks.

For frequency range 1, a reference point for the SS-RSRP is an antenna connector of the UE. For frequency range 2, the SS-RSRP is measured based upon a combined signal from antenna elements corresponding to a given receiver branch. For frequency range 1 and 2, if receiver diversity is in use by the UE, a reported SS-RSRP value shall not be lower than a corresponding SS-RSRP of individual receiver branches.

If the SS-RSRP is used for L1-RSRP, the SS-RSRP is applicable for one or more parameters and/or states, such as RRC_CONNECTED intra-frequency. In some examples, SS-RSRP is applicable for one or more parameters and/or states, such as RRC_IDLE intra-frequency, RRC_IDLE inter-frequency, RRC_INACTIVE intra-frequency, RRC_I-

NACTIVE inter-frequency, RRC_CONNECTED intra-frequency and/or RRC_CONNECTED inter-frequency.

CSI-RSRP is defined as a linear average over the power contributions (e.g., in [W]) of resource elements that carry CSI reference signals configured for RSRP measurements within a considered measurement frequency bandwidth in configured CSI-RS occasions.

For CSI-RSRP determination, CSI reference signals transmitted on an antenna port (e.g., antenna port 3000) is used. If CSI-RSRP is used for L1-RSRP, CSI reference signals transmitted on one or more antenna ports (e.g., antenna port 3000 and/or antenna port 3001) is used for CSI-RSRP determination.

For intra-frequency CSI-RSRP measurements, if a measurement gap is not configured, a UE is not expected to measure Channel State Information based Reference Signal (CSI-RS) resources outside of an active downlink bandwidth part.

For frequency range 1, a reference point for the CSI-RSRP is an antenna connector of the UE. For frequency range 2, the CSI-RSRP is measured based upon a combined signal from antenna elements corresponding to a given receiver branch. For frequency range 1 and 2, if receiver diversity is in use by the UE, a reported CSI-RSRP value is not lower than a corresponding CSI-RSRP of any of the individual receiver branches.

If the CSI-RSRP is used for L1-RSRP, the CSI-RSRP is applicable for one or more parameters and/or states, such as RRC_CONNECTED intra-frequency. In some examples, CSI-RSRP is applicable for one or more parameters and/or states, such as RRC_CONNECTED intra-frequency and/or RRC_CONNECTED inter-frequency.

In some examples, a number of resource elements within a measurement period that are used by a UE to determine SS-RSRP is left up to the UE implementation with the limitation that corresponding measurement accuracy requirements should be fulfilled. In some examples, a power per resource element is determined from energy received during a useful part of a symbol, excluding a Cyclic Prefix (CP).

SS-RSRQ and/or secondary SS-RSRQ are defined as a ratio of N×SS-RSRP/NR carrier Received Signal Strength Indicator (RSSI), where N is a number of resource blocks in a NR carrier RSSI measurement bandwidth. Measurements in the numerator and denominator (of the ratio) shall be made over a corresponding set of resource blocks.

NR carrier RSSI comprises a linear average of a total received power (in [W]) observed in one or more OFDM symbols of one or more measurement time resources, in the measurement bandwidth, over N number of resource blocks from all sources, comprising one or more of co-channel serving and non-serving cells, adjacent channel interference, thermal noise etc. The one or more measurement time resources for NR Carrier RSSI are confined within an SMTC window duration.

FIG. 5 illustrates a table 500 associated with NR carrier RSSI measurement symbols. If indicated by higher-layers, for a half-frame with SS/PBCH blocks, an NR Carrier RSSI is measured from OFDM symbols of indicated slots (e.g., the OFDM symbols of the indicated slots are associated with OFDM signal indication SS-RSSI-MeasurementSymbol-Config and/or symbol indexes illustrated in the table 500). For intra-frequency measurements, NR Carrier RSSI is measured with timing reference corresponding to a serving cell in a frequency layer. For inter-frequency measurements, NR Carrier RSSI is measured with a timing reference corresponding to any cell in a target frequency layer. In some examples, if a measurement gap is not used, the NR Carrier RSSI is measured from OFDM symbols within a SMTC window duration. In some examples, if a measurement gap is used, the NR Carrier RSSI is measured from OFDM symbols corresponding to an overlapped time span between an SMTC window duration and a minimum measurement time within the measurement gap.

In some examples, if higher-layers indicate one or more SS/PBCH blocks for performing SS-RSRQ measurements, then SS-RSRP is measured from the one or more SS/PBCH blocks.

For frequency range 1, a reference point for the SS-RSRQ is an antenna connector of a UE. For frequency range 2, the NR Carrier RSSI is measured based upon a combined signal from antenna elements corresponding to a given receiver branch, where combining (and/or the combined signal) for the NR Carrier RSSI is the same as combining (and/or a combined signal) used for SS-RSRP measurements. For frequency range 1 and 2, if receiver diversity is in use by the UE, the reported SS-RSRQ value is not lower than a corresponding SS-RSRQ of individual receiver branches.

In some examples, SS-RSRQ is applicable for one or more parameters and/or states, such as RRC_IDLE intra-frequency, RRC_IDLE inter-frequency, RRC_INACTIVE intra-frequency, RRC_INACTIVE inter-frequency, RRC_CONNECTED intra-frequency and/or RRC_CONNECTED inter-frequency.

CSI-RSRQ is defined as a ratio of N×CSI-RSRP to CSI-RSSI, where N is a number of resource blocks in a CSI-RSSI measurement bandwidth. Measurements in the numerator and denominator (of the ratio) shall be made over a corresponding set of resource blocks.

CSI-RSSI comprises a linear average of a total received power (in [W]) observed in one or more OFDM symbols of one or more measurement time resources, in the measurement bandwidth, over N number of resource blocks from all sources, comprising one or more of co-channel serving and non-serving cells, adjacent channel interference, thermal noise etc. The one or more measurement time resources for CSI-RSSI correspond to OFDM symbols containing configured CSI-RS occasions.

For CSI-RSRQ determination, CSI reference signals transmitted on an antenna port (e.g., antenna port 3000) is used. For intra-frequency CSI-RSRQ measurements, if a measurement gap is not configured, a UE is not expected to measure one or more CSI-RS resources outside of an active downlink bandwidth part.

For frequency range 1, a reference point for the CSI-RSRQ is an antenna connector of the UE. For frequency range 2, the CSI-RSSI is measured based upon a combined signal from antenna elements corresponding to a given receiver branch, where the combining (and/or the combined signal) for the CSI-RSSI is the same as combining (and/or a combined signal) used for CSI-RSRP measurements. For frequency range 1 and 2, if receiver diversity is in use by the UE, a reported CSI-RSRQ value is not lower than a corresponding CSI-RSRQ of individual receiver branches.

In some examples, CSI-RSRQ is applicable for one or more parameters and/or states, such as RRC_CONNECTED intra-frequency and/or RRC_CONNECTED inter-frequency.

SS-SINR is defined as a linear average over a power contribution (in [W]) of resource elements carrying secondary SSs divided by a linear average of noise and interference power contribution (in [W]) over the resource elements carrying secondary SSs within a corresponding frequency bandwidth. One or more measurement time resources for SS-SINR are confined within an SMTC window duration. For SS-SINR determination, demodulation reference signals for PBCH and/or secondary SSs is used. If higher-layers indicate one or more SS/PBCH blocks for performing SS-SINR measurements, then SS-SINR is measured from the one or more SS/PBCH blocks.

For frequency range 1, a reference point for the SS-SINR is an antenna connector of a UE. For frequency range 2, the SS-SINR is measured based on a combined signal from antenna elements corresponding to a given receiver branch. For frequency range 1 and 2, if receiver diversity is in use by the UE, a reported SS-SINR value is not lower than a corresponding SS-SINR of individual receiver branches.

In some examples, SS-SINR is applicable for one or more parameters and/or states, such as RRC_CONNECTED intra-frequency and/or RRC_CONNECTED inter-frequency.

CSI-SINR is defined as a linear average over a power contribution (in [W]) of resource elements carrying CSI reference signals divided by a linear average of noise and interference power contribution (in [W]) over the resource elements carrying CSI reference signals within a corresponding frequency bandwidth.

For CSI-SINR determination, CSI reference signals transmitted on an antenna port (e.g., antenna port 3000) is used. For intra-frequency CSI-SINR measurements, if a measurement gap is not configured, a UE is not expected to measure one or more CSI-RS resources outside of an active downlink bandwidth part.

For frequency range 1, a reference point for the CSI-SINR is an antenna connector of a UE. For frequency range 2, the CSI-SINR is measured based on a combined signal from antenna elements corresponding to a given receiver branch. For frequency range 1 and 2, if receiver diversity is in use by the UE, a reported CSI-SINR value is not lower than a corresponding CSI-SINR of individual receiver branches.

In some examples, CSI-SINR is applicable for one or more parameters and/or states, such as RRC_CONNECTED intra-frequency and/or RRC_CONNECTED inter-frequency.

3GPP TS 36.213 provides information associated with channel access procedures for LAA. An eNB operating one or more LAA SCells may perform channel access procedures for accessing one or more channels on which one or more transmissions of the one or more LAA SCells are performed.

An eNB may transmit a transmission comprising Physical Downlink Shared Channel (PDSCH), Physical Downlink Control Channel (PDCCH) and/or Enhanced Physical Downlink Control Channel (EPDCCH) on a carrier on which one or more transmissions of one or more LAA SCells are performed, after first sensing a channel to be idle during slot durations of a defer duration $T_d$; and after a counter N is zero in step 4 below. The counter N is adjusted by sensing the channel for one or more additional slot durations according to the steps below.

At step 1, set $N=N_{init}$, where $N_{init}$ is a random number uniformly distributed between 0 and $CW_p$, and go to step 4. At step 2, if N>0 and the eNB chooses to decrement the counter, set N=N−1. At step 3, sense the channel for an additional slot duration, and if the additional slot duration is idle, go to step 4; if the additional slot duration is not idle, go to step 5. At step 4, if N=0, stop; if N is not equal to 0, go to step 2. At step 5, sense the channel until either a busy slot is detected within an additional defer duration $T_d$ or slots (e.g., all slots) of the additional defer duration $T_d$ are detected to be idle. At step 6, if the channel is sensed to be idle during all the slot durations of the additional defer duration, go to step 4; else, go to step 5.

If an eNB has not transmitted a transmission including PDSCH, PDCCH and/or EPDCCH on a carrier on which one or more transmissions of one or more LAA SCells are performed after step 4 in the procedure above, the eNB may transmit a transmission including PDSCH, PDCCH and/or EPDCCH on the carrier if the channel is sensed to be idle at least in a slot duration $T_{sl}$ when the eNB is ready to transmit PDSCH, PDCCH and/or EPDCCH and if the channel has been sensed to be idle during slot durations (and/or all slot durations) of a defer duration $T_d$ before this transmission. If the channel has not been sensed to be idle in a slot duration $T_{sl}$ when the eNB first senses the channel after it is ready to transmit and/or if the channel has been sensed to be not idle during one or more (and/or any) slot durations of a defer duration $T_d$ before an intended transmission, the eNB proceeds to step 1 after sensing the channel to be idle during the slot durations of a defer duration $T_d$.

A defer duration $T_d$ consists of duration $T_f=16$ μs (microseconds) followed by $m_p$ consecutive slot durations, where each slot duration is $T_{sl}=9$ μs, and $T_f$ includes an idle slot duration $T_{sl}$ at a start of $T_f$. A slot duration $T_{sl}$ is considered to be idle if the eNB senses a channel during the slot duration, and the power detected by the eNB for at least 4 μs within the slot duration is less than energy detection threshold $X_{Thresh}$. Otherwise, the slot duration $T_{sl}$ is considered to be busy.

FIG. 6 illustrates a table 600 associated with channel access priority classes. $CW_p$, where $CW_{min,p} \leq CW_p \leq CW_{max,p}$, is a contention window. $CW_p$ (e.g., the contention window) is adjusted. $CW_{min,p}$ and/or $CW_{max,p}$ is chosen before step 1 of the procedure above. $m_p$, $CW_{min,p}$ and/or $CW_{max,p}$ are based upon a channel access priority class associated with eNB transmission (as shown in the table 600). $X_{Thresh}$ is adjusted. In some examples, if the eNB transmits one or more discovery signal transmissions (not including PDSCH, PDCCH and/or EPDCCH) when N>0 (in the procedure above), the eNB may not decrement N during one or more slot durations overlapping the one or more discovery signal transmissions. In some examples, the eNB may not continuously transmit on a carrier on which one or more transmissions of one or more LAA SCells are performed, for a period exceeding $T_{mcot,p}$ (as shown in the table 600). In some examples, for p=3 and/or p=4, if an absence of any other technology sharing the carrier can be guaranteed on a long term basis (e.g., by level of regulation), $T_{mcot,p}=10$ ms (milliseconds). In some examples, $T_{mcot,p}=8$ ms.

In some examples, for LAA operation (e.g., LAA operation in one or more regions, such as in Japan), if the eNB has transmitted a transmission after N=0 (in step 4 of the procedure above), the eNB may transmit a next continuous transmission, for a duration of maximum $T_j=4$ ms, after sensing a channel to be idle for at least a sensing interval of $T_{js}=34$ μs and if the total sensing and transmission time is not more than $$1000 \times T_{mcot} + \left\lfloor \frac{T_{mcot}}{T_j} - 1 \right\rfloor \times T_{js} \text{ μs}.$$

$T_{js}$ consists of duration $T_f=16$ μs followed by two slot durations (e.g., $T_{sl}=9$ μs each) and $T_f$ includes an idle slot duration $T_{sl}$ at a start of $T_f$. The channel is considered to be idle for $T_{js}$ if it is sensed to be idle during the during slot durations of $T_{js}$.

A UE and/or an eNB scheduling uplink transmissions for the UE may perform procedures for the UE to access one or more channels on which one or more transmissions of one or more LAA SCells are performed. The UE may access a carrier on which one or more transmissions of one or more LAA SCells are performed according to Type 1 or Type 2 uplink channel access procedures.

If an uplink grant scheduling a Physical Uplink Shared Channel (PUSCH) transmission indicates Type 1 channel access procedure, the UE may use Type 1 channel access procedure for transmitting transmissions including the PUSCH transmission. If an uplink grant scheduling a PUSCH transmission indicates Type 2 channel access procedure, the UE may use Type 2 channel access procedure for transmitting transmissions including the PUSCH transmission. The UE may use Type 1 channel access procedure for transmitting Sounding Reference Signal (SRS) transmissions not including a PUSCH transmission. Uplink channel access priority class p=1 is used for SRS transmissions not including a PUSCH. If the UE is scheduled to transmit PUSCH and SRS in subframe n, and if the UE cannot access the channel for PUSCH transmission in the subframe n, the UE may attempt to perform an SRS transmission in subframe n according to uplink channel access procedures specified for SRS transmission.

FIG. 7 illustrates a table 700 associated with channel access priority classes. In some examples, for p=3 and/or for p=4, $T_{ulmcot,p}$=10 ms if a higher layer parameter 'absenceOfAnyOtherTechnology-r14' indicates TRUE. In some examples, $T_{ulmcot,p}$=6 ms. In some examples, if $T_{ulmcot,p}$=6 ms, $T_{ulmcot,p}$ is increased to 8 ms by inserting one or more gaps. A minimum duration of a gap is 100 μs. A maximum duration before including a gap is 6 ms.

If a 'UL duration and offset' field configures a 'UL offset' l and a 'UL duration' d for subframe n, then the UE may use channel access Type 2 for transmissions in subframes n+l+i where i=0, 1, . . . , d−1, irrespective of the channel access Type signalled in the uplink grant for those subframes, if the end of UE transmission occurs in or before subframe n+l+d−1.

If the UE scheduled to transmit transmissions including PUSCH in a set of subframes $n_0, n_1, \ldots, n_{w-1}$ using PDCCH Downlink Control Information (DCI) Format 0B/4B, and/or if the UE cannot access the channel for a transmission in subframe $n_k$, the UE may attempt to make a transmission in subframe $n_{k+1}$ according to the channel access type indicated in a DCI, where k∈{0, 1, . . . , w−2}, and w is the number of scheduled subframes indicated in the DCI.

If the UE is scheduled to transmit transmissions without gaps including PUSCH in a set of subframes $n_0, n_1, \ldots, n_{w-1}$ using one or more PDCCH DCI Formats 0A/0B/4A/4B and/or the UE performs a transmission in subframe $n_k$ after accessing the carrier according to one of Type 1 or Type 2 uplink channel access procedures, the UE may continue transmission in subframes after $n_k$ where k∈{0, 1, . . . , w−1}

If a beginning of UE transmission in subframe n+1 immediately follows an end of UE transmission in subframe n, the UE is not expected to be indicated with different channel access types for transmissions in subframes n and n+1.

If the UE is scheduled to transmit without gaps in subframes $n_0, n_1, \ldots, n_{w-1}$ using one or more PDCCH DCI Formats 0A/0B/4A/4B, and/or if the UE has stopped transmitting during or before subframe $n_{k1}$, k1∈{0, 1, . . . , w−2}, and if the channel is sensed by the UE to be continuously idle after the UE has stopped transmitting, the UE may transmit in a later subframe $n_{k2}$, k2∈{1, . . . , w−1} using Type 2 channel access procedure. If the channel sensed by the UE is not continuously idle after the UE has stopped transmitting, the UE may transmit in a later subframe $n_{k2}$, k2∈{0, 1, . . . , w−1} using Type 1 channel access procedure with an uplink channel access priority class indicated in the DCI corresponding to subframe $n_{k2}$.

If the UE receives an uplink grant and the DCI indicates a PUSCH transmission starting in subframe n using Type 1 channel access procedure, if the UE has an ongoing Type 1 channel access procedure before subframe n and/or if an uplink channel access priority class value $p_1$ used for the ongoing Type 1 channel access procedure is greater than or equal to an uplink channel access priority class value $p_2$ indicated in the DCI, the UE may transmit the PUSCH transmission in response to the uplink grant by accessing the carrier by using the ongoing Type 1 channel access procedure.

In some examples, if the UE receives an uplink grant and the DCI indicates a PUSCH transmission starting in subframe n using Type 1 channel access procedure, if the UE has an ongoing Type 1 channel access procedure before subframe n and/or if an uplink channel access priority class value $p_1$ used for the ongoing Type 1 channel access procedure is less than to an uplink channel access priority class value $p_2$ indicated in the DCI, the UE may terminate the ongoing Type 1 channel access procedure.

If the UE is scheduled to transmit on a set of carriers C in subframe n, and if uplink grants scheduling PUSCH transmissions on the set of carriers C indicate Type 1 channel access procedure, and if a same 'PUSCH starting position' is indicated for carriers (e.g., all carriers) in the set of carriers C, and if the carrier frequencies of the set of carriers C is a subset of one of the sets of carrier frequencies, the UE may transmit on carrier $c_i$∈C using Type 2 channel access procedure. In some examples, if Type 2 channel access procedure is performed on carrier $c_i$ before a UE transmission on carrier $c_j$∈C where i≠j, and if the UE has accessed the carrier $c_j$ using Type 1 channel access procedure, the carrier $c_j$ is selected by the UE uniformly randomly from the set of carriers C before performing Type 1 channel access procedure on a carrier in the set of carriers C.

An eNB may indicate Type 2 channel access procedure in a DCI of an uplink grant scheduling one or more transmissions including PUSCH on a carrier in subframe n when the eNB has transmitted on the carrier, or an eNB may indicate using the 'UL duration and offset' field that the UE may perform a Type 2 channel access procedure for one or more transmissions including PUSCH on a carrier in subframe n when the eNB has transmitted on the carrier, or an eNB may schedule transmissions including PUSCH on a carrier in subframe n, that follows a transmission by the eNB on that carrier with a duration of $T_{short\_ul}$=25 μs, if subframe n occurs within the time interval starting at $t_0$ and ending at $t_0+T_{CO}$, where $T_{CO}=T_{mcot,p}+T_g$, $t_0$ is a time instant when the eNB has started transmission, $T_{mcot,p}$ is determined by the eNB and/or $T_g$ is a total duration of gaps of duration greater than 25 μs that occur between a downlink transmission of the eNB and an uplink transmission scheduled by the eNB, and between any two uplink transmissions scheduled by the eNB starting from $t_0$.

The eNB may schedule uplink transmissions between $t_0$ and $t_0+T_{CO}$ in contiguous subframes if the uplink transmissions can be scheduled contiguously. For an uplink transmission on a carrier that follows a transmission by the eNB on the carrier within a duration of $T_{short\_ul}$=25 μs, the UE may use Type 2 channel access procedure for the uplink transmission. If the eNB indicates Type 2 channel access procedure for the UE in the DCI, the eNB indicates the channel access priority class used to obtain access a channel in the DCI.

3GPP TS 36.300 provides information associated with LAA. LAA is associated with carrier aggregation with at least one SCell operating in the unlicensed spectrum. In LAA, a configured set of serving cells for a UE may comprise at least one SCell operating in the unlicensed spectrum according to Frame structure Type 3, also called LAA SCell. Unless otherwise specified, LAA SCells act as regular SCells.

If the absence of IEEE802.11n/11ac devices sharing the carrier cannot be guaranteed on a long term basis (e.g., by level of regulation), and/or if a maximum number of unlicensed channels that E-UTRAN can simultaneously transmit on is equal to and/or less than 4, a maximum frequency separation between two carrier center frequencies on which LAA SCell transmissions are performed is less than or equal to 62 MHz. A UE is required to support frequency separation.

An LAA eNB and/or a UE may apply Listen-Before-Talk (LBT) before performing a transmission on an LAA SCell. When LBT is applied, a transmitter listens to and/or senses a channel to determine whether the channel is free or busy. If the channel is determined to be free, the transmitter may perform the transmission; otherwise, it may not perform the transmission. If an LAA eNB uses channel access signals of other technologies for the purpose of LAA channel access, it may meet an LAA maximum energy detection threshold requirement.

A combined time of transmissions compliant with a channel access procedure by an eNB may not exceed 50 ms in a contiguous 1 second period on an LAA SCell. An LBT type (e.g., Type 1 uplink channel access and/or Type 2 uplink channel access) the UE applies is signalled via an uplink grant for uplink PUSCH transmission on LAA SCells.

FIG. 8 illustrates a table 800 associated with mapping between Channel Access Priority Classes and Quality of Service (QoS) Class Identifiers (QCIs). For uplink LAA operation, the eNB may not schedule (for) the UE more subframes than a minimum quantity of subframes necessary to transmit traffic corresponding to a selected Channel Access Priority Class and/or lower than a Channel Access Priority Class (e.g., such as a Channel Access Priority Class of Channel Access Priority Classes in the table 800) signalled in an uplink grant based on a latest Buffer Status Report (BSR) and received uplink traffic from the UE if Type 1 uplink channel access procedure is signalled to the UE. For uplink LAA operation, the eNB may not schedule (for) the UE more subframes than a minimum quantity of subframes necessary to transmit traffic corresponding to a selected Channel Access Priority Class and/or lower than a Channel Access Priority Class (e.g., such as a Channel Access Priority Class of Channel Access Priority Classes in the table 800) used by the eNB based upon downlink traffic, the latest BSR and/or received uplink traffic from the UE if Type 2 uplink channel access procedure is signalled to the UE.

Channel Access Priority Classes (such as Channel Access Priority Classes shown in table 800) is used when performing uplink transmissions and/or downlink transmissions in LAA carriers. The table 800 shows QCIs associated with Channel Access Priority Classes (e.g., the table 800 shows which Channel Access Priority Class should be used by traffic belonging to different standardized QCIs). A non-standardized QCI (e.g., Operator specific QCI) may use a suitable Channel Access Priority Class in table 800 (e.g., the suitable Channel Access Priority Class used for a non-standardized QCI is the Channel Access Priority Class of the standardized QCIs which best matches a traffic class of the non-standardized QCI). For uplink, the eNB selects the Channel Access Priority Class by taking into account a lowest priority QCI in a Logical Channel Group.

A plurality of Channel Access Priority Classes (e.g., four Channel Access Priority Classes) are defined (in the table 800). If a DL transmission burst (e.g., continuous transmission by E-UTRAN after a successful LBT) with PDSCH is transmitted, for which channel access has been obtained using a Channel Access Priority Class of the table 800, E-UTRAN may ensure that a transmission duration of the DL transmission burst does not exceed a minimum duration needed to transmit all available buffered traffic corresponding to one or more Channel Access Priority Classes≤P and/or the transmission duration of the DL transmission burst does not exceed the Maximum Channel Occupancy Time ($T_{mcot,p}$ as shown in table 600) for Channel Access Priority Class P. In some examples, additional traffic corresponding to one or more second Channel Access Priority Classes>P is included in the DL transmission burst if (and/or when) data corresponding to the one or more Channel Access Priority Classes≤P is not available for transmission (and/or if no data corresponding to the one or more Channel Access Priority Classes≤P is available for transmission). E-UTRAN may maximise occupancy of remaining transmission resources in the DL transmission burst with the additional traffic.

In some examples, for uplink PUSCH transmission, there is not an additional restriction at the UE (other than one or more multiplexing rules) on a type of traffic that can be carried in the scheduled subframes. For LAA, Discovery Reference Signal (DRS) Measurement Timing Configuration (DMTC) window is used by the UE to detect and/or measure cells transmitting one or more DRSs during the DMTC window and/or RSSI Measurement Timing Configuration (RMTC) is used by the UE to perform one or more RSSI measurements. In some examples, when LAA is configured, the eNB configures the UE with one DMTC window for neighbour cells (e.g., all neighbour cells) as well as for a serving cell (if any) on one frequency. In some examples, when LAA is configured, the UE is expected to detect and/or measure cells transmitting DRS during a configured DMTC window. In some examples, when LAA is configured, for channel selection in an environment where hidden nodes may exist, the UE is configured with one RMTC per frequency to perform RSSI measurement, and to report average RSSI and channel occupancy (e.g., percentage of measurement samples that RSSI value is above a threshold) in a reporting interval.

3GPP TS 38.321 provides information associated with random access resource selection in a random access procedure. The random access procedure is initiated by a PDCCH order, by a Medium Access Control (MAC) entity and/or by an RRC (in association with events in accordance with 3GPP TS 38.300 v15.0.0). In a MAC entity, merely one (or more) random access procedure is performed at a time. A random access procedure on an SCell, other than Primary Secondary Cell (PSCell), is initiated merely by a PDCCH order with an ra-PreambleIndex different than 0b000000.

If the MAC entity receives a request for a different random access procedure while another is already ongoing in the MAC entity, it is up to UE implementation whether to continue with the ongoing procedure or start with the new procedure (e.g. for a System Information (SI) request).

In some examples, the RRC may configure one or more parameters for the random access procedure and/or the one or more parameters may comprise one or more of: prach-ConfigIndex which is associated with an available set of Physical Random Access Channel (PRACH) occasions for transmission of a Random Access Preamble; preambleReceivedTargetPower which is associated with an initial Random Access Preamble power; rsrp-ThresholdSSB which is associated with an RSRP threshold for a selection of a Synchronization Signal Block (SSB) and corresponding Random Access Preamble and/or PRACH occasion where if the random access procedure is initiated for beam failure recovery, rsrp-ThresholdSSB refers to rsrp-ThresholdSSB in BeamFailureRecoveryConfig; rsrp-ThresholdCSI-RS which is associated with an RSRP threshold for a selection of a CSI-RS and corresponding Random Access Preamble and/or PRACH occasion where if the random access procedure is initiated for beam failure recovery, rsrp-ThresholdCSI-RS is set to a value calculated by multiplying rsrp-ThresholdSSB in BeamFailureRecoveryConfig by powerControlOffset; rsrp-ThresholdSSB-SUL which is associated with an RSRP threshold for a selection between a normal uplink (NUL) carrier and a Supplemental uplink (SUL) carrier; powerControlOffset which is associated with a power offset between rsrp-ThresholdSSB and rsrp-ThresholdCSI-RS to be used when the random access procedure is initiated for beam failure recovery; powerRampingStep which is associated with a power-ramping factor; powerRampingStepHighPriority which is associated with a power-ramping factor in case of differentiated random access procedure; scalingFactorBI which is a scaling factor for differentiated random access procedure; ra-PreambleIndex which is associated with the Random Access Preamble; ra-ssb-OccasionMaskIndex which may define one or more PRACH occasions associated with an SSB that is used for the MAC entity to transmit a Random Access Preamble; ra-OccasionList which may define one or more PRACH occasions associated with a CSI-RS in which the MAC entity may transmit a Random Access Preamble; preambleTransMax which is a maximum number of Random Access Preamble transmissions; ssb-perRACH-OccasionAndPreamblesPerSSB (e.g., for SpCell) which may define a number of SSBs mapped to each PRACH occasion and a number of Random Access Preambles mapped to each SSB; a set of Random Access Preambles and/or PRACH occasions for SI request, if any; a set of Random Access Preambles and/or PRACH occasions for beam failure recovery request, if any; ra-ResponseWindow (e.g., for SpCell) which is associated with a time window to monitor one or more RA responses; ra-ContentionResolutionTimer (e.g., for SpCell) which is associated with a Contention Resolution Timer.

In some examples, if groupBconfigured is configured, then Random Access Preambles group B is configured. In some examples, Random Access Preambles in Random Access Preamble group A are Random Access Preambles 0 to numberOfRA-PreamblesGroupA−1, if Random Access Preambles group B is configured. In some examples, the Random Access Preambles in Random Access Preamble group A are the Random Access Preambles 0 to the number of Random Access Preambles per SSB configured by the ssb-perRACH-OccasionAndPreamblesPerSSB. In some examples, Random Access Preambles in Random Access Preambles group B is the Random Access Preambles numberOfRA-PreamblesGroupA to the number of Random Access Preambles per SSB configured by ssb-perRACH-OccasionAndPreamblesPerSSB (if the Random Access Preambles group B is configured and/or exists (within the one or more parameters)). In some examples, if Random Access Preambles group B is supported by a cell and/or SSBs are mapped to Random Access Preambles, Random Access Preambles group B is included in each SSB. In some examples, if the Random Access Preambles group B is configured and/or exists (within the one or more parameters), the one or more parameters may comprise one or more of: ra-Msg3SizeGroupA which is associated with a threshold to determine groups of Random Access Preambles; deltaPreambleMsg3 which is associated with $\Delta_{PREAMBLE\_Msg3}$; messagePowerOffsetGroupB which is associated with a power offset for preamble selection.

In some examples, information associated with a related Serving Cell is available for UEs. For example, if Random Access Preambles group B is configured and/or exists (within the one or more parameters) and/or if the related Serving Cell for the Random Access procedure is configured with a supplementaryUplink, and/or an SUL carrier is selected for performing Random Access Procedure, the information may comprise a $P_{CMAX,f,c}$ of the SUL carrier (as specified in 3GPP TS 38.101) and/or a $P_{CMAX,f,c}$ of a normal uplink (NUL) carrier (as specified in 3GPP TS 38.101).

In some examples, one or more UE variables is used for the Random Access procedure. The one or more UE variables may comprise one or more of: PREAMBLE_INDEX; PREAMBLE_TRANSMISSION_COUNTER; PREAMBLE_POWER_RAMPING_COUNTER; PREAMBLE_ POWER_RAMPING_STEP; PREAMBLE_RECEIVED_TARGET_POWER; PREAMBLE_BACKOFF; PCMAX; SCALING_FACTOR_BI; TEMPORARY_C-RNTI.

In some examples, when the Random Access procedure is initiated on a Serving Cell, the MAC entity may perform one or more operations, which may include one or more of: flush a Msg3 buffer; set the PREAMBLE_TRANSMISSION_COUNTER to 1; set the PREAMBLE_POWER_RAMPING_COUNTER to 1; set the PREAMBLE_BACKOFF to 0 ms; select a carrier for performing Random Access procedure and/or set the PCMAX to $P_{CMAX,f,c}$ if a carrier to use for the Random Access procedure is explicitly signaled; else if the carrier to use for the Random Access procedure is not explicitly signaled, if the Serving Cell for the Random Access procedure is configured with supplementaryUplink and/or if an RSRP of a downlink pathloss reference is less than sul-RSRP-Threshold, select the SUL carrier for performing Random Access procedure and/or set PCMAX to $P_{CMAX,f,c}$ of the SUL carrier; else select the NUL carrier for performing Random Access procedure and/or set PCMAX to $P_{CMAX,f,c}$ of the NUL carrier; set PREAMBLE_POWER_RAMPING_STEP to preamblePowerRampingStep; if powerRampingStepHighPriority is configured, if the Random Access procedure was initiated for beam failure recovery and/or if the Random Access procedure was initiated for handover, set the PREAMBLE_POWER_RAMPING_STEP to powerRampingStepHighPriority; set the SCALING_FACTOR_BI to 1; if scalingFactorBI is configured, if the Random Access procedure was initiated for beam failure recovery and/or if the Random Access procedure was initiated for handover, set the SCALING_FACTOR_BI to scalingFactorBI; perform a Random Access Resource selection procedure.

In some examples, the MAC entity may perform one or more operations associated with the Random Access Resource selection procedure. In some examples, a first condition is met if the Random Access procedure was initiated for beam failure recovery, if beamFailureRecoveryTimer is running and/or not configured, if contention-free Random Access Resources for beam failure recovery request associated with any of the SSBs and/or CSI-RSs have been (explicitly) provided by RRC and/or if the SSBs with Synchronization Signal (SS)-RSRP above rsrp-Threshold-SSB amongst SSBs in candidateBeamRSList and/or the CSI-RSs with CSI-RSRP above csirs-Threshold amongst CSI-RSs in candidateBeamRSList are available. In some examples, if the first condition is met, an SSB with an SS-RSRP above rsrp-ThresholdSSB amongst SSBs in candidateBeamRSList or a CSI-RS with CSI-RSRP above csirs-Threshold amongst CSI-RSs in candidateBeamRSList is selected and/or, if CSI-RS is selected and/or there isn't ra-PreambleIndex associated with the CSI-RS, the PREAMBLE_INDEX is set to an ra-PreambleIndex corresponding to a SSB in candidateBeamRSList which is quasi-collocated with the CSI-RS and/or, if a CSI-RS is not selected and/or there is ra-PreambleIndex associated with the CSI-RS, the PREAMBLE_INDEX is set to an ra-PreambleIndex corresponding to the selected SSB or CSI-RS from the set of Random Access Preambles for beam failure recovery request.

In some examples, a second condition is met if the ra-PreambleIndex has been explicitly provided by either an PDCCH or the RRC, if the ra-PreambleIndex is not 0b000000 and/or if one or more contention-free Random Access Resources associated with SSBs or CSI-RS have not been explicitly provided by the RRC. In some examples, if the first condition is not met and/or if the second condition is met, the PREAMBLE_INDEX is set to the (signaled) ra-PreambleIndex.

In some examples, a third condition is met if contention-free Random Access Resources associated with SSBs have been explicitly provided by the RRC and/or at least one SSB with SS-RSRP above rsrp-ThresholdSSB amongst the associated SSBs is available. In some examples, if the first condition and/or the second condition are not met, and/or if the third condition is met, an SSB with SS-RSRP above rsrp-ThresholdSSB is selected from amongst the associated SSBs and/or the PREAMBLE_INDEX is set to a ra-PreambleIndex corresponding to the (selected) SSB.

In some examples, a fourth condition is met if contention-free Random Access Resources associated with CSI-RSs have been explicitly provided by the RRC and/or at least one CSI-RS with CSI-RSRP above rsrp-ThresholdCSI-RS amongst the associated CSI-RSs is available. In some examples, if the first condition, the second condition and/or the third condition are not met, and/or if the fourth condition is met, a CSI-RS with CSI-RSRP above rsrp-ThresholdCSI-RS is selected from amongst the associated CSI-RSs and/or the PREAMBLE_INDEX is set to a ra-PreambleIndex corresponding to the (selected) CSI-RS.

In some examples, if the first condition, the second condition, the third condition and/or the fourth condition are not met and/or if at least one SSB with SS-RSRP above rsrp-ThresholdSSB is available, an SSB with SS-RSRP above rsrp-ThresholdSSB is selected. In some examples, if the first condition, the second condition, the third condition and/or the fourth condition are not met and/or if at least one of the SSBs with SS-RSRP above rsrp-ThresholdSSB is not available, any SSB is selected.

A fifth condition is met if a potential Msg3 size (e.g., UL data available for transmission plus MAC header and, where required, MAC CEs) is greater than ra-Msg3SizeGroupA, a pathloss is less than PCMAX (of the Serving Cell performing the Random Access Procedure)−preambleReceivedTargetPower−msg3-DeltaPreamble−messagePowerOffset−GroupB and/or the random access procedure was initiated for Common Control Channel (CCCH) logical channel and the CCCH Service Data Unit (SDU) size plus MAC sub-header is greater than ra-Msg3SizeGroupA. In some examples, if the first condition, the second condition, the third condition and/or the fourth condition are not met and/or if Msg3 has not been transmitted (yet), and/or if the fifth condition is met and/or the Random Access Preambles group B is configured, the Random Access Preambles group B is selected. In some examples, if the first condition, the second condition, the third condition, the fourth condition and/or the fifth condition are not met and/or if Msg3 has not been transmitted (yet) and/or the Random Access Preambles group B is configured, the Random Access Preambles group A is selected. In some examples, if the first condition, the second condition, the third condition and/or the the fourth condition are not met and/or if Msg3 has not been transmitted (yet) and/or the Random Access Preambles group B is not configured, the Random Access Preambles group A is selected.

In some examples, if the first condition, the second condition, the third condition and/or the fourth condition are not met and/or if Msg3 has been transmitted, a (same) group of Random Access Preambles that was used for a Random Access Preamble transmission attempt corresponding to a first transmission of Msg3 is selected. In some examples, if the first condition, the second condition, the third condition and/or the fourth condition are not met and/or if an association between Random Access Preambles and/or SSBs is configured, an ra-PreambleIndex is selected randomly (with equal probability) from Random Access Preambles associated with a selected SSB and a selected Random Access Preambles group. In some examples, if the first condition, the second condition, the third condition and/or the fourth condition are not met and/or if an association between Random Access Preambles and/or SSBs is not configured, a ra-PreambleIndex is selected randomly (with equal probability) from the Random Access Preambles within the selected Random Access Preambles group. In some examples, if the first condition, the second condition, the third condition and/or the fourth condition are not met, the PREAMBLE_INDEX is set to the (selected) ra-PreambleIndex.

In some examples, a sixth condition is met if an SSB is selected (in one or more of the above steps) and/or an association between PRACH occasions and SSBs is configured. For example, if the sixth condition is met, a next available PRACH occasion is determined based upon PRACH occasions corresponding to the selected SSB permitted by the restrictions given by the ra-ssb-OccasionMaskIndex if configured (e.g., the MAC entity selects a PRACH occasion randomly and/or with equal probability amongst PRACH occasions occurring simultaneously on different subcarriers corresponding to the selected SSB and/or the MAC entity may take into account a possible occurrence of measurement gaps when determining the next available PRACH occasion corresponding to the selected SSB).

In some examples, a seventh condition is met if CSI-RS is selected (in one or more of the above steps) and/or an association between PRACH occasions and CSI-RSs is configured. For example, if the sixth condition is not met and/or the seventh condition is met, a next available PRACH occasion is determined based upon the PRACH occasions in ra-OccasionList corresponding to the selected CSI-RS (e.g., the MAC entity selects a PRACH occasion randomly and/or with equal probability amongst PRACH occasions occurring simultaneously on different subcarriers corresponding to the selected CSI-RS and/or the MAC entity may take into account the possible occurrence of measurement gaps when determining the next available PRACH occasion corresponding to the selected CSI-RS).

In some examples, an eighth condition is met if the random access procedure was initiated for beam failure recovery and/or if a CSI-RS is selected (in one or more of the above steps) and/or there isn't a contention-free Random Access Resource associated with the selected CSI-RS available. In some examples, if the sixth condition and/or the seventh condition are not met, and/or the eighth condition is met, a next available PRACH occasion is determined from the PRACH occasions permitted by the restrictions given by the ra-ssb-OccasionMaskIndex if configured corresponding to an SSB in candidateBeamRSList which is quasi-collocated with the selected CSI-RS (e.g., the MAC entity may take into account a possible occurrence of measurement gaps when determining the next available PRACH occasion which is quasi-collocated with the selected CSI-RS). In some examples, if the sixth condition, the seventh condition and/or the eighth condition are not met, a next available PRACH occasion is determined (e.g., the MAC entity selects a PRACH occasion randomly and/or with equal probability amongst PRACH occasions occurring simultaneously on different subcarriers and/or the MAC entity may take into account a possible occurrence of measurement gaps when determining the next available PRACH occasion).

In some examples, a Random Access Preamble transmission procedure is performed. In some examples, the MAC entity may perform one or more operations associated with the Random Access Preamble transmission procedure. For example, if the PREAMBLE_TRANSMISSION_COUNTER is greater than one, if a notification of suspending power ramping counter has not been received from lower layers and/or if a selected SSB is not changed (e.g., if the selected SSB is the same as an SSB used in a previous Random Access Preamble transmission), the PREAMBLE_POWER_RAMPING_COUNTER is incremented (by 1). In some examples, a value of DELTA_PREAMBLE is set.

In some examples, the PREAMBLE_RECEIVED_TARGET_POWER is set to preambleReceivedTargetPower+DELTA_PREAMBLE+(PREAMBLE_POWER_RAMPING_COUNTER-1)×PREAMBLE_POWER_RAMPING_STEP.

In some examples, excluding contention-free Random Access Preamble for beam failure recovery request, a Random Access Radio Network Temporary Identifier (RA-RNTI) associated with a PRACH occasion in which the Random Access Preamble is transmitted is computed. In some examples, a physical layer is instructed to transmit the Random Access Preamble using a selected PRACH, the (corresponding) RA-RNTI (if available), the PREAMBLE_INDEX and/or the PREAMBLE_RECEIVED_TARGET_POWER.

The RA-RNTI is computed by performing one or more (mathematical) operations, such as: RA-RNTI=1+s_id+14× t_id+14×80×f_id+14×80×8×ul_carrier_id. where s_id is an index of a first OFDM symbol of a specified PRACH (0≤s_id≤14); t_id is an index of a first slot of the specified PRACH in a system frame (0≤t_id<80); f_id is an index of a specified PRACH in the frequency domain (0≤f_id<8); and ul_carrier_id is a UL carrier used for Msg1 transmission (e.g., 0 for normal carrier, and/or 1 for SUL carrier).

3GPP TS 38.331 provides information associated with performing measurements and/or deriving RSRP and/or RSRQ for one or more beams based upon SS and/or PBCH blocks and/or CSI-RS.

An RRC_CONNECTED UE may derive cell measurement results by measuring one or more beams associated with a cell (as configured by a network). For cell measurement results in RRC_CONNECTED, a UE applies a layer 3 filtering, before using the cell measurement results for evaluation of reporting criteria and/or measurement reporting. For cell measurements, the network may configure RSRP, RSRQ and/or SINR as a trigger quantity. Reporting quantities is similar to a trigger quantity and/or a combination of quantities (e.g., a combination of quantities may correspond to one or more of RSRP and RSRQ, RSRP and SINR, RSRQ and SINR, etc. and a trigger quantity may correspond to RSRP, RSRQ and/or SINR).

The network may also configure the UE to report measurement information per beam (which can either be measurement results per beam with one or more respective beam identifiers and/or merely one or more beam identifiers). If beam measurement information is configured to be included in measurement reports, the UE may apply layer 3 beam filtering. An exact layer 1 filtering of beam measurements used to derive cell measurement results is implementation dependent.

In some examples, when the UE has a measConfig configured, the UE may perform one or more RSRP and/or RSRQ measurements for which servingCellMO is configured. For example, the UE may derive layer 3 filtered RSRP and RSRQ per beam for a serving cell based on a SS/PBCH block if at least one measId included in the measIdList within VarMeasConfig contains an rsType set to ssb and/or if at least one measId included in the measIdList within VarMeasConfig contains a reportQuantityRsIndexes and maxNrofRSIndexesToReport. In some examples, the UE may derive serving cell measurement results based on the SS/PBCH block if at least one measId included in the measIdList within VarMeasConfig contains an rsType set to ssb.

In some examples, the UE may derive layer 3 filtered RSRP and RSRQ per beam for the serving cell based on CSI-RS if at least one measId included in the measIdList within VarMeasConfig contains an rsType set to csi-rs and/or if at least one measId included in the measIdList within VarMeasConfig contains a reportQuantityRsIndexes and maxNrofRSIndexesToReport. In some examples, the UE may derive serving cell measurement results based on CSI-RS if at least one measId included in the measIdList within VarMeasConfig contains an rsType set to csi-rs.

In some examples, the UE may derive layer 3 filtered SINR based on SS/PBCH block if at least one measId included in the measIdList within VarMeasConfig contains SINR as trigger quantity and/or reporting quantity, if an associated reportConfig contains rsType set to ssb and/or if the measId contains a reportQuantityRsIndexes and maxNrofRSIndexesToReport. In some examples, the UE may derive a serving cell SINR based on SS/PBCH block if at least one measId included in the measIdList within VarMeasConfig contains SINR as trigger quantity and/or reporting quantity and/or if the associated reportConfig contains rsType set to ssb.

In some examples, the UE may derive layer 3 filtered SINR per beam for the serving cell based on CSI-RS if at least one measId included in the measIdList within VarMeasConfig contains SINR as trigger quantity and/or reporting quantity, if an associated reportConfig contains rsType set to csi-rs and/or if the measId contains a reportQuantityRsIndexes and maxNrofRSIndexesToReport. In some examples, the UE may derive a serving cell SINR based on CSI-RS if at least one measId included in the measIdList within VarMeasConfig contains SINR as trigger quantity and/or reporting quantity and/or if an associated reportConfig contains rsType set to csi-rs.

In some examples, for each measId included in a measIdList within VarMeasConfig, the UE may derive layer 3 filtered beam measurements based on CSI-RS for each measurement quantity indicated in reportQuantityRsIndexes if a reportType for an associated reportConfig is periodical and/or eventTriggered, if a measurement gap configuration is setup, if the UE does not require measurement gaps to perform concerned measurements, if s-MeasureConfig is not configured, if s-MeasureConfig is set to ssb-RSRP and the NR SpCell RSRP based on SS/PBCH block, after layer 3 filtering, is lower than ssb-RSRP, if s-MeasureConfig is set to csi-RSRP and the NR SpCell RSRP based on CSI-RS, after layer 3 filtering, is lower than csi-RSRP, if the measObject is associated with NR and the rsType is set to csi-rs and/or if reportQuantityRsIndexes and maxNrofRSIndexesToReport for the associated reportConfig are configured.

In some examples, for each measId included in the measIdList within VarMeasConfig, the UE may derive cell measurement results based on CSI-RS for each trigger quantity and/or each measurement quantity indicated in reportQuantityCell using parameters from an associated measObject if a reportType for an associated reportConfig is periodical and/or eventTriggered, if a measurement gap configuration is setup, if the UE does not require measurement gaps to perform concerned measurements, if s-MeasureConfig is not configured, if s-MeasureConfig is set to ssb-RSRP and the NR SpCell RSRP based on SS/PBCH block, after layer 3 filtering, is lower than ssb-RSRP, if s-MeasureConfig is set to csi-RSRP and the NR SpCell RSRP based on CSI-RS, after layer 3 filtering, is lower than csi-RSRP and/or if the measObject is associated with NR and the rsType is set to csi-rs.

In some examples, for each measId included in the measIdList within VarMeasConfig, the UE may derive layer 3 beam measurements based on SS/PBCH block for each measurement quantity indicated in reportQuantityRsIndexes if a reportType for an associated reportConfig is periodical and/or eventTriggered, if a measurement gap configuration is setup, if the UE does not require measurement gaps to perform concerned measurements, if s-MeasureConfig is not configured, if s-MeasureConfig is set to ssb-RSRP and the NR SpCell RSRP based on SS/PBCH block, after layer 3 filtering, is lower than ssb-RSRP, if s-MeasureConfig is set to csi-RSRP and the NR SpCell RSRP based on CSI-RS, after layer 3 filtering, is lower than csi-RSRP, if the measObject is associated with NR and the rsType is set to ssb and/or if reportQuantityRsIndexes and/or maxNrofRSIndexesToReport for the associated reportConfig are configured.

In some examples, for each measId included in the measIdList within VarMeasConfig, the UE may derive cell measurement results based on SS/PBCH block for each trigger quantity and each measurement quantity indicated in reportQuantityCell using parameters from an associated measObject if a reportType for an associated reportConfig is periodical and/or eventTriggered, if a measurement gap configuration is setup, if the UE does not require measurement gaps to perform concerned measurements, if s-MeasureConfig is not configured, if s-MeasureConfig is set to ssb-RSRP and the NR SpCell RSRP based on SS/PBCH block, after layer 3 filtering, is lower than ssb-RSRP, if s-MeasureConfig is set to csi-RSRP and the NR SpCell RSRP based on CSI-RS, after layer 3 filtering, is lower than csi-RSRP and/or if the measObject is associated with NR and the rsType is set to ssb.

In some examples, for each measId included in the measIdList within VarMeasConfig, the UE may perform corresponding measurements associated with neighbouring cells on frequencies indicated in a concerned measObject if a reportType for an associated reportConfig is periodical and/or eventTriggered, if a measurement gap configuration is setup, if the UE does not require measurement gaps to perform concerned measurements, if s-MeasureConfig is not configured, if s-MeasureConfig is set to ssb-RSRP and the NR SpCell RSRP based on SS/PBCH block, after layer 3 filtering, is lower than ssb-RSRP, if s-MeasureConfig is set to csi-RSRP and the NR SpCell RSRP based on CSI-RS, after layer 3 filtering, is lower than csi-RSRP and/or if the measObject is associated with E-UTRA.

In some examples, for each measId included in the measIdList within VarMeasConfig, the UE may perform evaluation of reporting criteria.

In some examples, the UE may perform one or more operations associated with layer 3 filtering. For example, for each cell measurement quantity and/or for each beam measurement quantity that the UE performs measurements, a measured result is filtered before using the measured result for evaluation of reporting criteria and/or for measurement reporting. The measured result is filtered using the following equation: $F_n = (1-a) \times F_{n-1} + a \times M_n$, where $M_n$ is a latest (and/or last) received measurement result from a physical layer, $F_n$ is an updated filtered measurement result that is used for evaluation of reporting criteria or for measurement reporting, $F_{n-1}$ is an old filtered measurement result, where $F_0$ is set to $M_1$ when the measurement result from the physical layer is received, $$a = \frac{1^{\frac{k}{4}}}{2},$$

and/or k is a filterCoefficient for the corresponding measurement quantity received by the quantityConfig. In some examples, the UE may adapt (e.g., modify) the filter such that time characteristics of the filter are preserved at different input rates (e.g., observing that the filterCoefficient k assumes a sample rate equal to X ms, the value of X is equivalent to one intra-frequency L1 measurement period (assuming non-DRX operation), and/or may depend on frequency range). In some examples, if k is set to 0, layer 3 filtering is not applicable. In some examples, the filtering is performed in the same domain as used for evaluation of reporting criteria and/or for measurement reporting (e.g., logarithmic filtering for logarithmic measurements). In some examples, a filter input rate is implementation dependent (e.g., to fulfil performance requirements).

In some examples, the UE may perform one or more operations for deriving cell measurement results. A network may configure the UE to derive RSRP, RSRQ and/or SINR measurement results per cell associated with NR measurement objects based on parameters configured in measObject (e.g., a maximum number of beams to be averaged and/or beam consolidation thresholds) and in reportConfig (e.g., rsType to be measured, such as SS/PBCH block and/or CSI-RS).

In some examples, for each cell measurement quantity to be derived based on SS/PBCH block, if nrofSS-BlocksToAverage in an associated measObject is not configured, if absThreshSS-BlocksConsolidation in the associated measObject is not configured and/or if a highest beam measurement quantity value is below absThreshSS-Blocks- Consolidation, the UE may derive each cell measurement quantity based on SS/PBCH block as the highest beam measurement quantity value, else the UE may derive each cell measurement quantity based on SS/PBCH block as a linear average of power values of the highest beam measurement quantity values above absThreshSS-BlocksConsolidation where a total number of averaged beams shall not exceed nrofSS-BlocksToAverage. In some examples, for each cell measurement quantity to be derived based on SS/PBCH block, the UE may apply layer 3 cell filtering.

In some examples, for each cell measurement quantity to be derived based on CSI-RS, the UE may consider a CSI-RS resource to be applicable for deriving cell measurements when the concerned CSI-RS resource is included in csi-rs-ResourceCellMobility including physCellId of the cell in CSI-RS-ConfigMobility in the associated measObject. In some examples, for each cell measurement quantity to be derived based on CSI-RS, if nrofCSI-RS-ResourcesToAverage in the associated measObject is not configured, if absThreshCSI-RS-Consolidation in the associated measObject is not configured and/or if the highest beam measurement quantity value is below absThreshCSI-RS-Consolidation, the UE may derive each cell measurement quantity based on applicable CSI-RS resources for the cell as the highest beam measurement quantity value, else the UE may derive each cell measurement quantity based on CSI-RS as a linear average of power values of highest beam measurement quantity values above absThreshCSI-RS-Consolidation where a total number of averaged beams shall not exceed nroCSI-RS-ResourcesToAverage. In some examples, for each cell measurement quantity to be derived based on CSI-RS, the UE may apply layer 3 cell filtering.

The UE may perform one or more operations for deriving layer 3 beam filtered measurements. In some examples, for each layer 3 beam filtered measurement quantity to be derived based on SS/PBCH block, the UE may derive each configured beam measurement quantity based on SS/PBCH block and/or the UE may apply layer 3 beam filtering. In some examples, for each layer 3 beam filtered measurement quantity to be derived based on CSI-RS, the UE may derive each configured beam measurement quantity based on CSI-RS and/or the UE may apply layer 3 beam filtering.

3GPP R1-1716941, "RAN1 #90 meeting report", provides information associated with beam selection. In some examples, selection of an SSB and/or selection of a corresponding PRACH resource, for path-loss estimation and/or transmission based upon SSBs that satisfy one or more thresholds, is performed based upon UE implementation. For example, if a UE does not detect an SSB that satisfies the one or more thresholds, it selects any SSB that allows the UE to meet a target received power of a RACH preamble with a maximum transmit power. In some examples, the UE selects an RX beam to find a list of SSBs that satisfy the one or more thresholds.

3GPP R2-1801702, "RAN2 #AH-1801 meeting report", provides information associated with UE implementation. For example, it is up to UE implementation how to choose a suitable SSB (and a corresponding RACH resource) for PRACH transmission if an SSB and/or a RACH resource is not above an RSRP threshold. MAC rapporteur may tell RRC rapporteur to align parameters. It is assumed that SSB and CSI-RS are not configured at the same time for handover.

3GPP RAN2 #102 chairman notes provides information associated with random access procedures on NR-U. Contention based random access and/or contention free random access is supported.

In some examples, random access resource selection in a random access procedure is performed in an NR MAC system. A UE performs SSB (and/or CSI-RS) selection and/or PRACH resource selection (if one or more PRACH resources are configured) based upon one or more RSRP values of one or more detected SSBs and/or one or more RSRP values of one or more detected CSI-RSs.

Random access procedure in NR-U operation is supported. In NR-U operation, an unlicensed spectrum is shared by a plurality of operations and/or a plurality of cells. RSRP (e.g., a value indicative of signal power of resource elements carrying a signal) may not be able to fully indicate a quality of a channel (e.g., an unlicensed channel of the unlicensed spectrum), such as a contention level associated with the channel. In some examples, it is required that a network and/or the UE perform LBT before performing transmissions on the unlicensed spectrum (e.g., LBT is applied by the UE and/or the network to perform communications using the unlicensed spectrum). As a result of the network and/or the UE performing LBT before performing transmissions on the unlicensed spectrum, the UE (and/or the network) may suffer (long) delays if channel quality is not taken into consideration when performing RACH resource selection.

In some examples, the UE selects an SSB from amongst a group of SSBs associated with RSRP values above a threshold (e.g., rsrp-ThresholdSSB). In some examples, the UE selects a PRACH resource associated with the SSB (selected from the group of SSBs). However, a beam identified by the SSB may have high levels of interference and/or noise from one or more co-channel serving cells (and/or one or more adjacent serving cells) and/or from one or more co-channel non-serving cells (and/or one or more adjacent non-serving cells) in an unlicensed spectrum (even if a measured RSRP value of the SSB is above the threshold). When the UE performs a random access preamble transmission with the PRACH resource associated with the SSB, the UE encounters a delay (e.g., a long delay) due to consecutive LBT failures if resources and/or beam direction associated with the SSB is occupied (and/or heavily occupied) by one or more unlicensed cells and/or other RATs.

In some examples, a UE performs one or more operations in order to mitigate a delay encountered due to LBT failures due to resources and/or beam direction associated with an SSB being occupied (by one or more unlicensed cells and/or other RATs).

In a first embodiment, a UE selects an SSB for a random access procedure on a serving cell based upon a measurement result. The measurement result comprises (and/or is indicative of) received power (observed) from one or more sources in a measurement bandwidth. For example, the UE selects an SSB for a random access procedure on a serving cell based upon an RSRQ (e.g., an SS-RSRQ), an RSSI (e.g., an NR carrier RSSI), channel occupancy and/or an RSRP (e.g., an SS-RSRP) (associated with the SSB).

In some examples, the one or more sources (e.g., the one or more sources in the measurement bandwidth) comprises the serving cell, one or more co-channel serving cells and/or one or more co-channel non-serving cells. In some examples, the one or more sources (e.g., the one or more sources in the measurement bandwidth) comprises adjacent channel interference and/or thermal noise.

In some examples, the UE selects an SSB for a random access procedure on a serving cell based upon whether an RSRP value associated with the SSB satisfies a first criterion. For example, the UE selects the SSB for the random access procedure on the serving cell responsive to a determination that the RSRP value associated with the SSB satisfies the first criterion. In some examples, the UE does not select the SSB for the random access procedure on the serving cell responsive to a determination that the RSRP value associated with the SSB does not satisfy the first criterion.

In some examples, the UE selects an SSB for a random access procedure on a serving cell based upon whether a measurement result associated with the SSB satisfies a second criterion. For example, the UE selects the SSB for the random access procedure on the serving cell responsive to a determination that the measurement result associated with the SSB satisfies the second criterion. In some examples, the UE does not select the SSB for the random access procedure on the serving cell responsive to a determination that the measurement result associated with the SSB does not satisfy the second criterion.

In some examples, the UE selects an SSB for a random access procedure on a serving cell based upon whether an RSRP value associated with the SSB satisfies the first criterion and whether a measurement result associated with the SSB satisfies the second criterion. For example, the UE selects the SSB for the random access procedure on the serving cell responsive to a determination that the RSRP value associated with the SSB satisfies the first criterion and that the measurement result associated with the SSB satisfies the second criterion. In some examples, the UE does not select the SSB for the random access procedure on the serving cell responsive to a determination that the RSRP value associated with the SSB does not satisfy the first criterion and/or that the measurement result associated with the SSB does not satisfy the second criterion.

In some examples, the first criterion is associated with an RSRP value being above (and/or equal to) a first threshold (e.g., a threshold RSRP). For example, the RSRP value satisfies the first criterion if the RSRP value is above (and/or equal to) the first threshold. In some examples, the RSRP value may not satisfy the first criterion if the RSRP value is below (and/or equal to) the first threshold.

In some examples, the second criterion is associated with a measurement result being above (and/or equal to) a second threshold (e.g., a threshold measurement value). For example, the measurement result satisfies the second criterion if the measurement result is above (and/or equal to) the second threshold. In some examples, the measurement result may not satisfy the second criterion if the measurement result is below (and/or equal to) the second threshold.

In some examples, the second criterion is associated with a measurement result being below (and/or equal to) the second threshold. For example, the measurement result satisfies the second criterion if the measurement result is below (and/or equal to) the second threshold. In some examples, the measurement result may not satisfy the second criterion if the measurement result is above (and/or equal to) the second threshold.

In some examples, the UE selects an SSB for a random access procedure on a serving cell. In some examples, the UE selects the SSB for a PRACH resource selection. In some examples, the UE may perform a random access preamble transmission on the serving cell in an unlicensed spectrum after the PRACH resource selection (is performed). In some examples, the UE may perform a random access preamble transmission on a licensed cell after the PRACH resource selection (is performed).

In some examples, the UE selects an SSB for a random access procedure on a serving cell based upon a measurement result associated with the SSB (and/or based upon whether the measurement result satisfies the second criterion). In some examples, the measurement result is an RSRQ (e.g., an SS-RSRQ) (associated with the SSB). In some examples, the measurement result is an RSSI (e.g., an NR carrier RSSI) (associated with the SSB). In some examples, the measurement result is channel occupancy (associated with the SSB). In some examples, the measurement result is an SINR (e.g., an SS-SINR) (associated with the SSB).

In some examples, the measurement result is a proportion (e.g., a percentage) of measurement samples, associated with the SSB, that are associated with RSSI values above (and/or equal to) a threshold (e.g., a threshold RSSI) (e.g., the proportion of measurement samples may correspond to a relationship of a total number of measurement samples associated with measurements of the SSB with an amount of measurement samples corresponding to measurement samples that are associated with RSSI values above (and/or equal to) the threshold).

In some examples, the measurement result may comprise (and/or is indicative of) power received from a direction (e.g., a certain direction). The direction is associated with the SSB.

In some examples, the measurement result is indicative of a channel quality of a direction associated with reception by the UE of the SSB (e.g., the channel quality and/or the direction is determined based upon how the UE receives the SSB).

In some examples, the measurement result is measured via (and/or by) a UE beam used to receive (and/or perform one or more measurements on) the SSB.

In some examples, the measurement result and/or an RSRP of the SSB is measured simultaneously (e.g., using a single symbol). In some examples, the measurement result and/or an RSRP associated with the SSB is measured separately (e.g., using separate symbols). In some examples, the measurement result and/or the RSRP is derived from (and/or identified within) a single symbol.

In some examples, the UE selects an SSB from amongst SSBs with RSRQs (e.g., SS-RSRQs) above (and/or equal to) a third threshold (e.g., a threshold RSRQ). In some examples, the UE selects an SSB from amongst SSBs with RSSIs (e.g., NR carrier RSSIs) below (and/or equal to) a fifth threshold (e.g., a threshold RSSI). In some examples, the UE selects an SSB from amongst SSBs with channel occupancies below (and/or equal to) a sixth threshold.

In an example, the UE selects an SSB with an RSRQ (e.g., an SS-RSRQ) above (and/or equal to) the third threshold from amongst SSBs, wherein an RSRP (e.g., an SS-RSRP) of the SSB is above (and/or equal to) a fourth threshold.

In another example, the UE selects an SSB with an RSRQ (e.g., an SS-RSRQ) above (and/or equal to) the third threshold from amongst SSBs with RSRPs (e.g., SS-RSRPs) above (and/or equal to) the fourth threshold.

In another example, the UE selects an SSB with a highest RSRQ (e.g., a highest SS-RSRQ) from amongst SSBs with RSRPs above (and/or equal to) the fourth threshold (e.g., the SSB is associated with an RSRQ higher than other SSBs of the SSBs).

In another example, the UE may not select an SSB with an RSRQ (e.g., an SS-RSRQ) below (and/or equal to) the third threshold from amongst SSBs, wherein an RSRP (e.g., an SS-RSRP) of the SSB is above (and/or equal to) the fourth threshold.

In another example, the UE may not select an SSB with an RSRQ (e.g., an SS-RSRQ) below (and/or equal to) the third threshold from amongst SSBs with RSRPs (e.g., SS-RSRPs) above (and/or equal to) the fourth threshold.

In another example, the UE selects an SSB with an RSRP (e.g., an SS-RSRP) above (and/or equal to) the fourth threshold from amongst SSBs with RSRQ values (e.g., SS-RSRQ values) above (and/or equal to) the third threshold.

In another example, the UE may not select an SSB with an RSRP (e.g., an SS-RSRP) below (and/or equal to) the fourth threshold from amongst SSBs with RSRQs (e.g., SS-RSRQs) above (and/or equal to) the third threshold.

In another example, the UE may not select an SSB with an RSRQ (e.g., an SS-RSRQ) below (and/or equal to) the third threshold when an RSRP (e.g., an SS-RSRP) of the SSB is above (and/or equal to) the fourth threshold.

In another example, the UE may not select an SSB with an RSRP (e.g., an SS-RSRP) below (and/or equal to) the fourth threshold when an RSRQ (e.g., an SS-RSRQ) of the SSB is above (and/or equal to) the third threshold.

In another example, the UE selects an SSB with an NR carrier RSSI value below (and/or equal to) the fifth threshold from amongst SSBs with RSRPs (e.g., SS-RSRPs) above (and/or equal to) the fourth threshold.

In another example, the UE selects an SSB with a lowest RSSI from amongst SSBs with RSRPs above (and/or equal to) the fourth threshold (e.g., the SSB is associated with an RSSI lower than RSSIs of other SSBs of the SSBs).

In another example, the UE may not select an SSB with an NR carrier RSSI value above (and/or equal to) the fifth threshold from amongst SSBs with RSRPs (e.g., SS-RSRPs) above (and/or equal to) the fourth threshold.

In another example, the UE selects an SSB with an RSRP (e.g., an SS-RSRP) above (and/or equal to) the fourth threshold from amongst SSBs with NR carrier RSSI values below (and/or equal to) the fifth threshold.

In another example, the UE may not select an SSB with an RSRP (e.g., an SS-RSRP) below (and/or equal to) the fourth threshold from amongst SSBs with NR carrier RSSI values below (and/or equal to) the fifth threshold.

In another example, the UE selects an SSB with a channel occupancy below (and/or equal to) the sixth threshold from amongst SSBs with RSRPs (e.g., SS-RSRPs) above (and/or equal to) the fourth threshold.

In another example, the UE selects an SSB with a lowest channel occupancy from amongst SSBs with RSRPs (e.g., SS-RSRPs) above (and/or equal to) the fourth threshold (e.g., the SSB is associated with a channel occupancy lower than channel occupancies of other SSBs of the SSBs).

In another example, the UE may not select an SSB with a channel occupancy above (and/or equal to) the sixth threshold from amongst SSBs with RSRPs (e.g., SS-RSRPs) above (and/or equal to) the fourth threshold.

In another example, the UE selects an SSB with an RSRP (e.g., an SS-RSRP) above (and/or equal to) the fourth threshold from amongst SSBs with channel occupancies below (and/or equal to) the sixth threshold.

In another example, the UE may not select an SSB with an RSRP (e.g., an SS-RSRP) below (and/or equal to) the fourth threshold from amongst SSBs with channel occupancies below (and/or equal to) the sixth threshold.

In another example, the UE selects an SSB with an RSRP (e.g., an SS-RSRP) above (and/or equal to) the fourth threshold from amongst SSBs if the SSBs do not comprise one or more SSBs with RSRQs (e.g., SS-RSRQs) above (and/or equal to) the third threshold.

In another example, the UE selects an SSB with an RSRP (e.g., an SS-RSRP) above (and/or equal to) the fourth threshold from amongst SSBs if the SSBs do not comprise one or more SSBs with NR carrier RSSIs below (and/or equal to) the fifth threshold.

In another example, the UE selects an SSB with an RSRP (e.g., an SS-RSRP) above (and/or equal to) the fourth threshold from amongst SSBs if the SSBs do not comprise one or more SSBs with channel occupancies below (and/or equal to) the sixth threshold.

In another example, the UE may not select an SSB with an RSRQ (e.g., an SS-RSRQ) below (and/or equal to) the third threshold from amongst SSBs if the SSBs comprise one or more other SSBs (of the SSBs) with RSRQs (e.g., SS-RSRQs) above (and/or equal to) the third threshold.

In another example, the UE selects an SSB with an RSRQ (e.g., an SS-RSRQ) below (and/or equal to) the third threshold from amongst SSBs if the SSBs do not comprise one or more SSBs with RSRQs (e.g., SS-RSRQs) above (and/or equal to) the third threshold.

In another example, the UE selects an SSB with a highest RSRQ (e.g., a highest SS-RSRQ) from amongst SSBs (e.g., the SSB is associated with an RSRQ higher than other SSBs of the SSBs).

In another example, the UE may not select an SSB with an RSSI (e.g., an NR carrier RSSI) above (and/or equal to) the fifth threshold from amongst SSBs if the SSBs comprise one or more SSBs (of the SSBs) with RSSIs (e.g., NR carrier RSSIs) below (and/or equal to) the fifth threshold.

In another example, the UE selects an SSB with an RSSI (e.g., an NR carrier RSSI) above (and/or equal to) the fifth threshold from amongst SSBs if the SSBs do not comprise one or more SSBs with RSSIs (e.g., NR carrier RSSIs) below (and/or equal to) the fifth threshold.

In another example, the UE selects an SSB with a lowest RSSI (e.g., a lowest NR carrier RSSI) from amongst SSBs (e.g., the SSB is associated with an RSSI lower than other SSBs of the SSBs).

In another example, the UE may not select an SSB with a channel occupancy above (and/or equal to) the sixth threshold from amongst SSBs if the SSBs comprise one or more SSBs (of the SSBs) with channel occupancies below (and/or equal to) the sixth threshold.

In another example, the UE selects an SSB with a channel occupancy above (and/or equal to) the sixth threshold from amongst SSBs if the SSBs do not comprise one or more SSBs with channel occupancies below (and/or equal to) the sixth threshold.

In another example, the UE selects an SSB with a lowest channel occupancy from amongst SSBs (e.g., the SSB is associated with a channel occupancy lower than other SSBs of the SSBs).

In another example, the UE selects an SSB with a highest RSRQ (e.g., SS-RSRQ) from amongst SSBs if the SSBs do not comprise one or more SSBs with RSRQs (e.g., SS-RSRQs) above (and/or equal to) the third threshold.

In another example, the UE selects an SSB with a lowest RSSI (e.g., NR carrier RSSI) from amongst SSBs if the SSBs do not comprise one or more SSBs with RSSIs (e.g., NR carrier RSSIs) below (and/or equal to) the fifth threshold.

In another example, the UE selects an SSB with a lowest channel occupancy from amongst SSBs if the SSBs do not comprise one or more SSBs with channel occupancies below (and/or equal to) the sixth threshold.

In some examples, the first threshold is configured by a network. In some examples, the second threshold is configured by the network. In some examples, the third threshold is configured by the network. In some examples, the fourth threshold is configured by the network. In some examples, the fourth threshold is rsrp-ThresholdSSB. In some examples, the fifth threshold is configured by the network. In some examples, the sixth threshold is configured by the network. In some examples, the measurement bandwidth is configured by the network. In some examples, the measurement bandwidth is an overlapped time span between an SMTC window duration and a minimum measurement time within a measurement gap (if the measurement gap is used). In some examples, the measurement bandwidth is different from a second measurement bandwidth for measuring an RSRP. In some examples, the measurement bandwidth is a measurement bandwidth for measuring an RSRQ (e.g., the measurement bandwidth is used for measuring an RSRQ). In some examples, the measurement bandwidth is a measurement bandwidth for measuring an RSSI (e.g., the measurement bandwidth is used for measuring an RSSI). In some examples, the measurement bandwidth is a measurement bandwidth for measuring a channel occupancy (e.g., the measurement bandwidth is used for measuring a channel occupancy).

Figure 9:
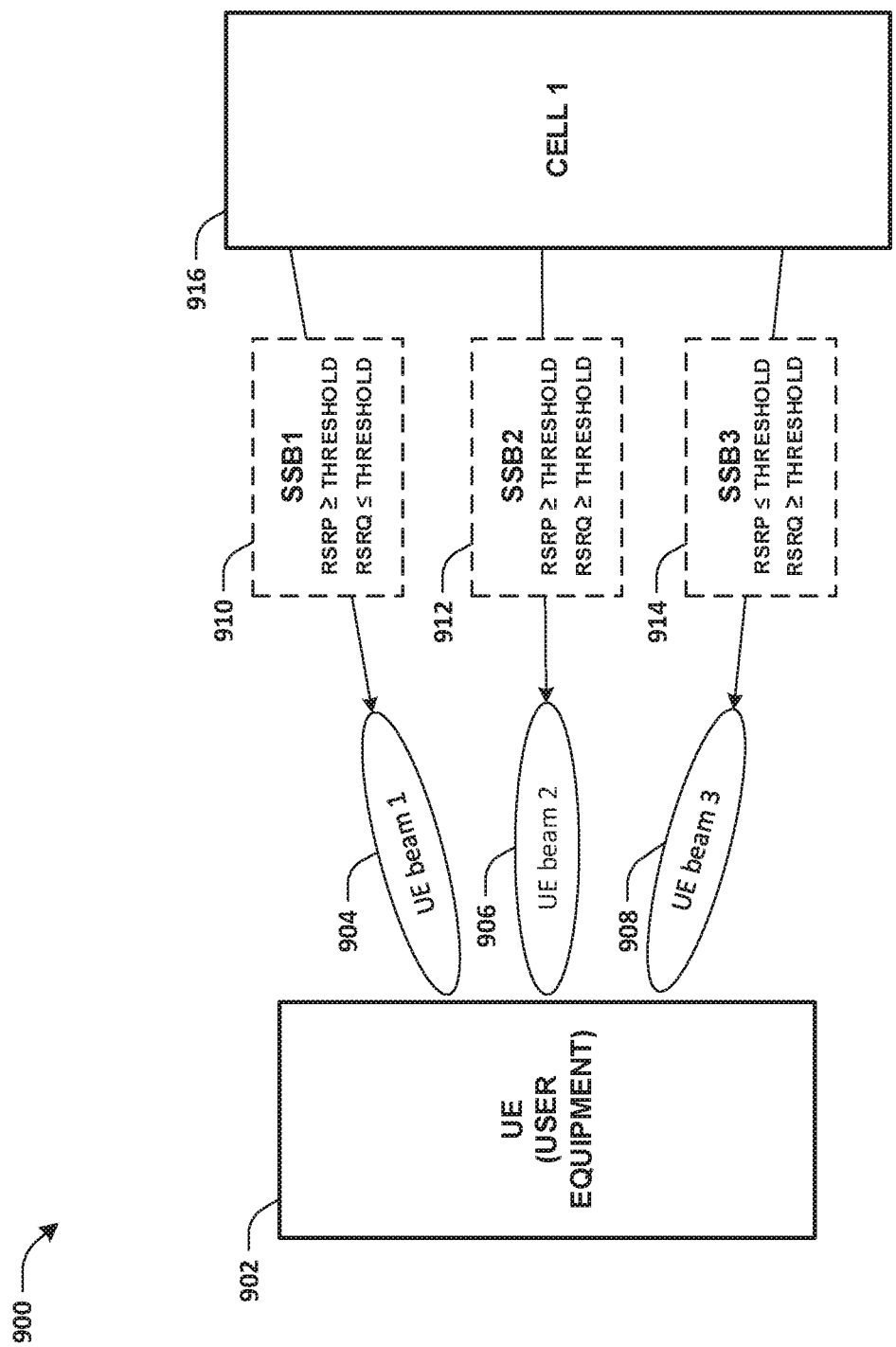
FIG. 9 illustrates an example scenario associated with a random access procedure.

FIG. 9 illustrates an example scenario 900 associated with a random access procedure (e.g., one or more of a contention based random access procedure, a contention free random access procedure, a random access procedure for beam failure recovery, a random access procedure for handover, a random access procedure for uplink data arrival, a random access procedure for initial access, a random access procedure for Secondary Cell Group (SCG) change, etc.). For example, a UE 902 may initiate a random access procedure on a serving cell 916 ("CELL 1"). The serving cell 916 may transmit a plurality of SSBs. The plurality of SSBs may comprise a first SSB 910 ("SSB1"), a second SSB 912 ("SSB2") and/or a third SSB 914 ("SSB3").

In some examples, the UE 902 may receive and/or analyze one or more SSBs of the plurality of SSBs. For example, the UE 902 may receive and/or analyze the first SSB 910 via a first UE beam 904 ("UE beam 1"). The UE 902 may perform one or more measurements associated with the first SSB 910. For example, the UE 902 may perform an RSRP measurement and/or an RSRQ measurement associated with the first SSB 910 to determine a first RSRP measurement result and/or a first RSRQ measurement result associated with the first SSB 910. The first RSRP measurement result is indicative of a first RSRP of the first SSB 910 satisfying a first criterion (and/or the first RSRP being suitable). For example, it is determined that the first RSRP satisfies the first criterion based upon the first RSRP being above (and/or equal to) the fourth threshold (e.g., an RSRP threshold, such as rsrp-ThresholdSSB). In some examples, the first RSRQ measurement result is indicative of a first RSRQ of the first SSB 910 not satisfying a second criterion (and/or the first RSRQ being unsuitable). For example, it is determined that the first RSRQ does not satisfy the second criterion based upon the first RSRQ being below (and/or equal to) the third threshold (e.g., an RSRQ threshold) (e.g., which is indicative of high interference and/or an unacceptable level of interference).

In some examples, the UE 902 may receive and/or analyze the second SSB 912 via a second UE beam 906 ("UE beam 2"). The UE 902 may perform one or more measurements associated with the second SSB 912. For example, the UE 902 may perform an RSRP measurement and/or an RSRQ measurement associated with the second SSB 912 to determine a second RSRP measurement result and/or a second RSRQ measurement result associated with the second SSB 912. The second RSRP measurement result is indicative of a second RSRP of the second SSB 912 satisfying the first criterion (and/or the second RSRP being suitable). For example, it is determined that the second RSRP satisfies the first criterion based upon the second RSRP being above (and/or equal to) the fourth threshold. In some examples, the second RSRQ measurement result is indicative of a second RSRQ of the second SSB 912 satisfying the second criterion (and/or the second RSRQ being suitable). For example, it is determined that the second RSRQ satisfies the second criterion based upon the second RSRQ being above (and/or equal to) the third threshold (e.g., which is indicative of low interference and/or an acceptable level of interference). Accordingly, (both) the second RSRP and the second RSRQ are determined to be suitable (e.g., the second RSRP satisfies the first criterion and/or the second RSRQ satisfies the second criterion).

In some examples, the UE 902 may receive and/or analyze the third SSB 914 via a third UE beam 908 ("UE beam 3"). The UE 902 may perform one or more measurements associated with the third SSB 914. For example, the UE 902 may perform an RSRP measurement and/or an RSRQ measurement associated with the third SSB 914 to determine a third RSRP measurement result and/or a third RSRQ measurement result associated with the third SSB 914. The third RSRP measurement result is indicative of a third RSRP of the third SSB 914 not satisfying the first criterion (and/or the third RSRP being unsuitable). For example, it is determined that the third RSRP does not satisfy the first criterion based upon the third RSRP being below (and/or equal to) the fourth threshold. In some examples, the third RSRQ measurement result is indicative of a third RSRQ of the third SSB 914 satisfying the second criterion (and/or the third RSRQ being suitable). For example, it is determined that the third RSRQ satisfies the second criterion based upon the third RSRQ being above (and/or equal to) the third threshold.

In some examples, the UE 902 selects the second SSB 912 for the random access procedure. The UE 902 selects the second SSB 912 from the plurality of SSBs (for the random access procedure) responsive to a determination that (both) the second RSRP and the second RSRQ associated with the second SSB 912 are suitable (e.g., the second RSRP satisfies the first criterion and/or the second RSRQ satisfies the second criterion). In some examples, the UE 902 selects the second SSB 912 from the plurality of SSBs (for the random access procedure) responsive to a determination that the second RSRP associated with the second SSB 912 is above (and/or equal to) the fourth threshold and/or a determination that the second RSRQ associated with the second SSB 912 is above (and/or equal to) the third threshold.

In some examples, the UE selects a CSI-RS from amongst a group of CSI-RSs associated with RSRP values above a threshold (e.g., rsrp-ThresholdCSI-RS) (rather than and/or in addition to selecting an SSB from amongst a group of SSBs). In some examples, the UE selects a PRACH resource associated with the CSI-RS (selected from the group of CSI-RSs). However, a beam, identified by the CSI-RS, may have high levels of interference and/or noise from one or more co-channel serving cells (and/or one or more adjacent serving cells) and/or from one or more co-channel non-serving cells (and/or one or more adjacent non-serving cells) in an unlicensed spectrum (even if a measured RSRP value of the CSI-RS is above the threshold). When the UE performs a random access preamble transmission with the PRACH resource associated with the CSI-RS, the UE may encounter a delay (e.g., a long delay) due to consecutive LBT failures if resources and/or beam direction associated with the CSI-RS is occupied (and/or heavily occupied) by one or more unlicensed cells and/or other RATs.

In some examples, a UE may perform one or more operations in order to mitigate a delay encountered due to LBT failures due to resources and/or beam direction associated with a CSI-RS being occupied (by one or more unlicensed cells and/or other RATs).

In a second embodiment, UE selects a CSI-RS for a random access procedure on a serving cell based upon a measurement result. The measurement result may comprise (and/or is indicative of) received power (observed) from one or more sources in a measurement bandwidth. For example, the UE selects a CSI-RS for a random access procedure on a serving cell based upon an RSRQ (e.g., a CSI-RSRQ), an RSSI (e.g., a CSI-RSSI), channel occupancy and/or an RSRP (e.g., a CSI-RSRP) (associated with the CSI-RS).

In some examples, the one or more sources (e.g., the one or more sources in the measurement bandwidth) may comprise the serving cell, one or more co-channel serving cells and/or one or more co-channel non-serving cells. In some examples, the one or more sources (e.g., the one or more sources in the measurement bandwidth) may comprise adjacent channel interference and/or thermal noise.

In some examples, the UE selects a CSI-RS for a random access procedure on a serving cell based upon whether an RSRP value associated with the CSI-RS satisfies a first criterion. For example, the UE selects the CSI-RS for the random access procedure on the serving cell responsive to a determination that the RSRP value associated with the CSI-RS satisfies the first criterion. In some examples, the UE may not select the CSI-RS for the random access procedure on the serving cell responsive to a determination that the RSRP value associated with the CSI-RS does not satisfy the first criterion.

In some examples, the UE selects a CSI-RS for a random access procedure on a serving cell based upon whether a measurement result associated with the CSI-RS satisfies a second criterion. For example, the UE selects the CSI-RS for the random access procedure on the serving cell responsive to a determination that the measurement result associated with the CSI-RS satisfies the second criterion. In some examples, the UE may not select the CSI-RS for the random access procedure on the serving cell responsive to a determination that the measurement result associated with the CSI-RS does not satisfy the second criterion.

In some examples, the UE selects a CSI-RS for a random access procedure on a serving cell based upon whether an RSRP value associated with the CSI-RS satisfies the first criterion and whether a measurement result associated with the CSI-RS satisfies the second criterion. For example, the UE selects the CSI-RS for the random access procedure on the serving cell responsive to a determination that the RSRP value associated with the CSI-RS satisfies the first criterion and that the measurement result associated with the CSI-RS satisfies the second criterion. In some examples, the UE may not select the CSI-RS for the random access procedure on the serving cell responsive to a determination that the RSRP value associated with the CSI-RS does not satisfy the first criterion and/or that the measurement result associated with the CSI-RS does not satisfy the second criterion.

In some examples, the first criterion is associated with an RSRP value being above (and/or equal to) a first threshold (e.g., a threshold RSRP). For example, the RSRP value satisfies the first criterion if the RSRP value is above (and/or equal to) the first threshold. In some examples, the RSRP value may not satisfy the first criterion if the RSRP value is below (and/or equal to) the first threshold.

In some examples, the second criterion is associated with a measurement result being above (and/or equal to) a second threshold (e.g., a threshold measurement value). For example, the measurement result satisfies the second criterion if the measurement result is above (and/or equal to) the second threshold. In some examples, the measurement result may not satisfy the second criterion if the measurement result is below (and/or equal to) the second threshold.

In some examples, the second criterion is associated with a measurement result being below (and/or equal to) the second threshold. For example, the measurement result satisfies the second criterion if the measurement result is below (and/or equal to) the second threshold. In some examples, the measurement result may not satisfy the second criterion if the measurement result is above (and/or equal to) the second threshold.

In some examples, the UE selects a CSI-RS for a random access procedure on a serving cell. In some examples, the UE selects the CSI-RS for a PRACH resource selection. In some examples, the UE may perform a random access preamble transmission in the serving cell in an unlicensed spectrum after the PRACH resource selection (is performed). In some examples, the UE may perform a random access preamble transmission on a licensed cell after the PRACH resource selection (is performed).

In some examples, the UE selects a CSI-RS for a random access procedure on a serving cell based upon a measurement result associated with the CSI-RS (and/or based upon whether the measurement result satisfies a second criterion). In some examples, the measurement result is an RSRQ (e.g., a CSI-RSRQ) (associated with the CSI-RS). In some examples, the measurement result is an RSSI (e.g., a CSI-RSSI) (associated with the CSI-RS). In some examples, the measurement result is channel occupancy (associated with the CSI-RS). In some examples, the measurement result is an SINR (e.g., an CSI-SINR) (associated with the CSI-RS).

In some examples, the measurement result is a proportion (e.g., a percentage) of measurement samples, associated with the CSI-RS, that are associated with RSSI values above (and/or equal to) a threshold (e.g., a threshold RSSI) (e.g., the proportion of measurement samples may correspond to a relationship of a total number of measurement samples associated with measurements of the CSI-RS with a number of measurement samples corresponding to measurement samples that are associated with RSSI values above (and/or equal to) the threshold).

In some examples, the measurement result may comprise (and/or is indicative of) power received from a direction (e.g., a certain direction). The direction is associated with the CSI-RS.

In some examples, the measurement result is indicative of a channel quality of a direction associated with reception by the UE of the CSI-RS (e.g., the channel quality and/or the direction is determined based upon how the UE receives the CSI-RS).

In some examples, the measurement result is measured via (and/or by) a UE beam used to receive (and/or perform one or more measurements on) the CSI-RS.

In some examples, the measurement result and/or an RSRP of the CSI-RS is measured simultaneously (e.g., using a single symbol). In some examples, the measurement result and/or an RSRP associated with the CSI-RS is measured separately (e.g., using separate symbols). In some examples, the measurement result and/or the RSRP is derived from (and/or identified within) a single symbol.

In some examples, the UE selects a CSI-RS from amongst CSI-RSs with RSRQs (e.g., CSI-RSRQs) above (and/or equal to) a third threshold (e.g., a threshold RSRQ). In some examples, the UE selects a CSI-RS from amongst CSI-RSs with RSSIs (e.g., CSI-RSSIs) below (and/or equal to) a fifth threshold (e.g., a threshold RSSI). In some examples, the UE selects a CSI-RS from amongst CSI-RSs with channel occupancies below (and/or equal to) a sixth threshold.

In an example, the UE selects a CSI-RS with an RSRQ (e.g., a CSI-RSRQ) above (and/or equal to) the third threshold from amongst CSI-RSs, wherein an RSRP (e.g., a CSI-RSRP) of the CSI-RS is above (and/or equal to) a fourth threshold.

In another example, the UE selects a CSI-RS with an RSRQ (e.g., a CSI-RSRQ) above (and/or equal to) the third threshold from amongst CSI-RSs with RSRPs (e.g., CSI-RSRPs) above (and/or equal to) the fourth threshold.

In another example, the UE selects a CSI-RS with a highest RSRQ (e.g., a highest CSI-RSRQ) from amongst CSI-RSs with RSRPs above (and/or equal to) the fourth threshold (e.g., the CSI-RS is associated with an RSRQ higher than other CSI-RSs of the CSI-RSs).

In another example, the UE may not select a CSI-RS with an RSRQ (e.g., a CSI-RSRQ) below (and/or equal to) the third threshold from amongst CSI-RSs, wherein an RSRP (e.g., a CSI-RSRP) of the CSI-RS is above (and/or equal to) the fourth threshold.

In another example, the UE may not select a CSI-RS with an RSRQ (e.g., a CSI-RSRQ) below (and/or equal to) the third threshold from amongst CSI-RSs with RSRPs (e.g., CSI-RSRPs) above (and/or equal to) the fourth threshold.

In another example, the UE selects a CSI-RS with an RSRP (e.g., a CSI-RSRP) above (and/or equal to) the fourth threshold from amongst CSI-RSs with RSRQ values (e.g., CSI-RSRQ values) above (and/or equal to) the third threshold.

In another example, the UE may not select a CSI-RS with an RSRP (e.g., a CSI-RSRP) below (and/or equal to) the fourth threshold from amongst CSI-RSs with RSRQs (e.g., CSI-RSRQs) above (and/or equal to) the third threshold.

In another example, the UE may not select a CSI-RS with an RSRQ (e.g., a CSI-RSRQ) below (and/or equal to) the third threshold when an RSRP (e.g., a CSI-RSRP) of the CSI-RS is above (and/or equal to) the fourth threshold.

In another example, the UE may not select a CSI-RS with an RSRP (e.g., a CSI-RSRP) below (and/or equal to) the fourth threshold when an RSRQ (e.g., a CSI-RSRQ) of the CSI-RS is above (and/or equal to) the third threshold.

In another example, the UE selects a CSI-RS with a CSI-RSSI value below (and/or equal to) the fifth threshold from amongst CSI-RSs with RSRPs (e.g., CSI-RSRPs) above (and/or equal to) the fourth threshold.

In another example, the UE selects a CSI-RS with a lowest RSSI from amongst CSI-RSs with RSRPs above (and/or equal to) the fourth threshold (e.g., the CSI-RS is associated with an RSSI lower than RSSIs of other CSI-RSs of the CSI-RSs).

In another example, the UE may not select a CSI-RS with a CSI-RSSI value above (and/or equal to) the fifth threshold from amongst CSI-RSs with RSRPs (e.g., CSI-RSRPs) above (and/or equal to) the fourth threshold.

In another example, the UE selects a CSI-RS with an RSRP (e.g., a CSI-RSRP) above (and/or equal to) the fourth threshold from amongst CSI-RSs with CSI-RSSI values below (and/or equal to) the fifth threshold.

In another example, the UE may not select a CSI-RS with an RSRP (e.g., a CSI-RSRP) below (and/or equal to) the fourth threshold from amongst CSI-RSs with CSI-RSSI values below (and/or equal to) the fifth threshold.

In another example, the UE selects a CSI-RS with a channel occupancy below (and/or equal to) the sixth threshold from amongst CSI-RSs with RSRPs (e.g., CSI-RSRPs) above (and/or equal to) the fourth threshold.

In another example, the UE selects a CSI-RS with a lowest channel occupancy from amongst CSI-RSs with RSRPs (e.g., CSI-RSRPs) above (and/or equal to) the fourth threshold (e.g., the CSI-RS is associated with a channel occupancy lower than channel occupancies of other CSI-RSs of the CSI-RSs).

In another example, the UE may not select a CSI-RS with a channel occupancy above (and/or equal to) the sixth threshold from amongst CSI-RSs with RSRPs (e.g., CSI-RSRPs) above (and/or equal to) the fourth threshold.

In another example, the UE selects a CSI-RS with an RSRP (e.g., a CSI-RSRP) above (and/or equal to) the fourth threshold from amongst CSI-RSs with channel occupancies below (and/or equal to) the sixth threshold.

In another example, the UE may not select a CSI-RS with an RSRP (e.g., a CSI-RSRP) below (and/or equal to) the fourth threshold from amongst CSI-RSs with channel occupancies below (and/or equal to) the sixth threshold.

In another example, the UE selects a CSI-RS with an RSRP (e.g., a CSI-RSRP) above (and/or equal to) the fourth threshold from amongst CSI-RSs if the CSI-RSs do not comprise one or more CSI-RSs with RSRQs (e.g., CSI-RSRQs) above (and/or equal to) the third threshold.

In another example, the UE selects a CSI-RS with an RSRP (e.g., a CSI-RSRP) above (and/or equal to) the fourth threshold from amongst CSI-RSs if the CSI-RSs do not comprise one or more CSI-RSs with CSI-RSSIs below (and/or equal to) the fifth threshold.

In another example, the UE selects a CSI-RS with an RSRP (e.g., a CSI-RSRP) above (and/or equal to) the fourth threshold from amongst CSI-RSs if the CSI-RSs do not comprise one or more CSI-RSs with channel occupancies below (and/or equal to) the sixth threshold.

In another example, the UE may not select a CSI-RS with an RSRQ (e.g., a CSI-RSRQ) below (and/or equal to) the third threshold from amongst CSI-RSs if the CSI-RSs comprise one or more other CSI-RSs (of the CSI-RSs) with RSRQs (e.g., CSI-RSRQs) above (and/or equal to) the third threshold.

In another example, the UE selects a CSI-RS with an RSRQ (e.g., a CSI-RSRQ) below (and/or equal to) the third threshold from amongst CSI-RSs if the CSI-RSs do not comprise one or more CSI-RSs with RSRQs (e.g., CSI-RSRQs) above (and/or equal to) the third threshold.

In another example, the UE selects a CSI-RS with a highest RSRQ (e.g., a highest CSI-RSRQ) from amongst CSI-RSs (e.g., the CSI-RS is associated with an RSRQ higher than other CSI-RSs of the CSI-RSs).

In another example, the UE may not select a CSI-RS with an RSSI (e.g., a CSI-RSSI) above (and/or equal to) the fifth threshold from amongst CSI-RSs if the CSI-RSs comprise one or more CSI-RSs (of the CSI-RSs) with RSSIs (e.g., CSI-RSSIs) below (and/or equal to) the fifth threshold.

In another example, the UE selects a CSI-RS with an RSSI (e.g., a CSI-RSSI) above (and/or equal to) the fifth threshold from amongst CSI-RSs if the CSI-RSs do not comprise one or more CSI-RSs with RSSIs (e.g., CSI-RSSIs) below (and/or equal to) the fifth threshold.

In another example, the UE selects a CSI-RS with a lowest RSSI (e.g., a lowest CSI-RSSI) from amongst CSI-RSs (e.g., the CSI-RS is associated with an RSSI lower than other CSI-RSs of the CSI-RSs).

In another example, the UE may not select a CSI-RS with a channel occupancy above (and/or equal to) the sixth threshold from amongst CSI-RSs if the CSI-RSs comprise one or more CSI-RSs (of the CSI-RSs) with channel occupancies below (and/or equal to) the sixth threshold.

In another example, the UE selects a CSI-RS with a channel occupancy above (and/or equal to) the sixth threshold from amongst CSI-RSs if the CSI-RSs do not comprise one or more CSI-RSs with channel occupancies below (and/or equal to) the sixth threshold.

In another example, the UE selects a CSI-RS with a lowest channel occupancy from amongst CSI-RSs (e.g., the CSI-RS is associated with a channel occupancy lower than other CSI-RSs of the CSI-RSs).

In another example, the UE selects a CSI-RS with a highest RSRQ (e.g., CSI-RSRQ) from amongst CSI-RSs if the CSI-RSs do not comprise one or more CSI-RSs with RSRQs (e.g., CSI-RSRQs) above (and/or equal to) the third threshold.

In another example, the UE selects a CSI-RS with a lowest RSSI (e.g., CSI-RSSI) from amongst CSI-RSs if the CSI-RSs do not comprise one or more CSI-RSs with RSSIs (e.g., CSI-RSSIs) below (and/or equal to) the fifth threshold.

In another example, the UE selects a CSI-RS with a lowest channel occupancy from amongst CSI-RSs if the CSI-RSs do not comprise one or more CSI-RSs with channel occupancies below (and/or equal to) the sixth threshold.

In some examples, the first threshold is configured by a network. In some examples, the second threshold is configured by the network. In some examples, the third threshold is configured by the network. In some examples, the fourth threshold is configured by the network. In some examples, the fourth threshold is rsrp-ThresholdCSI-RS. In some examples, the fifth threshold is configured by the network. In some examples, the sixth threshold is configured by the network.

In some examples, the measurement bandwidth is configured by the network. In some examples, the measurement bandwidth is different from a second measurement bandwidth for measuring an RSRP. In some examples, the measurement bandwidth is a measurement bandwidth for measuring an RSRQ (e.g., the measurement bandwidth is used for measuring an RSRQ). In some examples, the measurement bandwidth is a measurement bandwidth for measuring an RSSI (e.g., the measurement bandwidth is used for measuring an RSSI). In some examples, the measurement bandwidth is a measurement bandwidth for measuring a channel occupancy (e.g., the measurement bandwidth is used for measuring a channel occupancy). In some examples, the measurement bandwidth is an overlapped time span between an SMTC window duration and a minimum measurement time within a measurement gap (if the measurement gap is used).

In a third embodiment, a network may indicate (and/or instruct) a UE to select an SSB and/or a CSI-RS for a random access procedure on a serving cell based upon one or more types of measurement results. In some examples, the network may indicate (and/or instruct) the UE to select an SSB and/or a CSI-RS for a random access procedure on a serving cell based upon an RSRP (e.g., an SS-RSRP and/or a CSI-RSRP) and/or the one or more types of measurement results.

In an example where a network instructs and/or causes a UE to select an SSB for a random access procedure on a serving cell based upon the one or more types of measurement results, the one or more types of measurement results may comprise RSRP (e.g., SS-RSRP). In some examples, the one or more types of measurement results may comprise RSRQ (e.g., SS-RSRQ). In some examples, the one or more types of measurement results may comprise NR carrier RSSI. In some examples, the one or more types of measurement results may comprise channel occupancy. In some examples, the one or more types of measurement results may correspond to a proportion (e.g., a percentage) of measurement samples, associated with an SSB, that are associated with RSSI values (e.g., NR carrier RSSI values) above (and/or equal to) a threshold (e.g., a threshold RSSI).

In an example where a network instructs and/or causes a UE to select a CSI-RS for a random access procedure on a serving cell based upon the one or more types of measurement results, the one or more types of measurement results may comprise RSRP (e.g., CSI-RSRP). In some examples, the one or more types of measurement results may comprise RSRQ (e.g., CSI-RSRQ). In some examples, the one or more types of measurement results may comprise CSI-RSSI. In some examples, the one or more types of measurement results may comprise channel occupancy. In some examples, the one or more types of measurement results may correspond to a proportion (e.g., a percentage) of measurement samples, associated with a CSI-RS, that are associated with RSSI values (e.g., CSI-RSSI values) above (and/or equal to) a threshold (e.g., a threshold RSSI).

In a fourth embodiment, a lower layer of a UE may report, to an upper layer of the UE, one or more measurement results determined based upon measuring received power from one or more sources. The lower layer of the UE may report the one or more measurement results to the upper layer of the UE for SSB selection and/or for CSI-RS selection in a random access procedure on a serving cell. In some examples, the lower layer of the UE may report the one or more measurement results to the upper layer of the UE responsive to receiving a request from the upper layer of the UE (e.g., the request is a request for measurement results).

In some examples, the lower layer of the UE is a physical layer of the UE. In some examples, the upper layer of the UE is a MAC layer of the UE.

In some examples, the lower layer of the UE may report RSRQ (e.g., SS-RSRQ and/or CSI-RSRQ) and/or RSRP (e.g., SS-RSRP and/or CSI-RSRP) to the upper layer of the UE. In some examples, the lower layer of the UE may report RSSI (e.g., NR carrier RSSI and/or CSI-RSSI) and/or RSRP (e.g., SS-RSRP and/or CSI-RSRP) to the upper layer of the UE.

In some examples, the lower layer of the UE may report RSRP (e.g., SS-RSRP and/or CSI-RSRP), RSRQ (e.g., SS-RSRQ and/or CSI-RSRQ), RSSI (e.g., NR carrier RSSI and/or CSI-RSSI), channel occupancy and/or SINR (e.g., SS-SINR and/or CSI-SINR) to the upper layer of the UE.

In a fifth embodiment, a network may configure one or more parameters for a UE for random access resource selection in a random access procedure on a serving cell. The one or more parameters is used as one or more thresholds for one or more measurement results from one or more sources (e.g., the one or more sources is associated with the serving cell and/or a cell different than the serving cell). For example, the one or more parameters is indicative of the one or more thresholds which is used in accordance with one or more of the techniques presented herein. For example, the one or more parameters is used as (and/or is indicative of) one or more thresholds for RSRQ (e.g., SS-RSRQ and/or CSI-RSRQ), RSSI (e.g., NR carrier RSSI and/or CSI-RSSI), channel occupancy and/or RSRP (e.g., SS-RSRP and/or CSI-RSRP). For example, the one or more parameters (e.g., the one or more thresholds) is compared with an RSRQ (e.g., an SS-RSRQ and/or a CSI-RSRQ), an RSSI (e.g., an NR carrier RSSI and/or a CSI-RSSI), a channel occupancy and/or an RSRP (e.g., an SS-RSRP and/or a CSI-RSRP) to determine whether an SSB and/or a CSI-RS is suitable and/or satisfies a criterion.

In some examples, the one or more measurement results may comprise an RSRQ (e.g., a CSI-RSRQ and/or an SS-RSRQ), an RSSI (e.g., a CSI-RSSI and/or an NR carrier RSSI), a channel occupancy, an RSRP (e.g., a CSI-RSRP and/or an SS-RSRP) and/or an SINR (e.g., a CSI-SINR and/or an SS-SINR). In some examples, the network may configure the one or more parameters via system information. In some examples, the network may configure the one or more parameters via an RRC signaling.

In some examples, the one or more sources may comprise the serving cell, one or more co-channel serving cells and/or one or more co-channel non-serving cells. In some examples, the one or more sources (e.g., the one or more sources in the measurement bandwidth) may comprise adjacent channel interference and/or thermal noise.

In some examples, the random access procedure is a contention based random access procedure. In some examples, the random access procedure is a contention free random access procedure. In some examples, the random access procedure is a random access procedure for beam failure recovery. In some examples, the random access procedure is a random access procedure for handover. In some examples, the random access procedure is a random access procedure for uplink data arrival. In some examples, the random access procedure is a random access procedure for initial access. In some examples, the random access procedure is a random access procedure for SCG change.

In some examples, each of the first embodiment, the second embodiment, the third embodiment, the fourth embodiment and the fifth embodiment, is implemented independently and/or separately. In some examples, a combination of two or more of the first embodiment, the second embodiment, the third embodiment, the fourth embodiment and/or the fifth embodiment is implemented. In some examples, a combination of two or more of the first embodiment, the second embodiment, the third embodiment, the fourth embodiment and/or the fifth embodiment is implemented simultaneously.

Various techniques of the present disclosure is performed independently and/or separately from one another. In some examples, various techniques of the present disclosure is combined and/or implemented using a single system. In some examples, various techniques of the present disclosure is implemented simultaneously.

Figure 10:
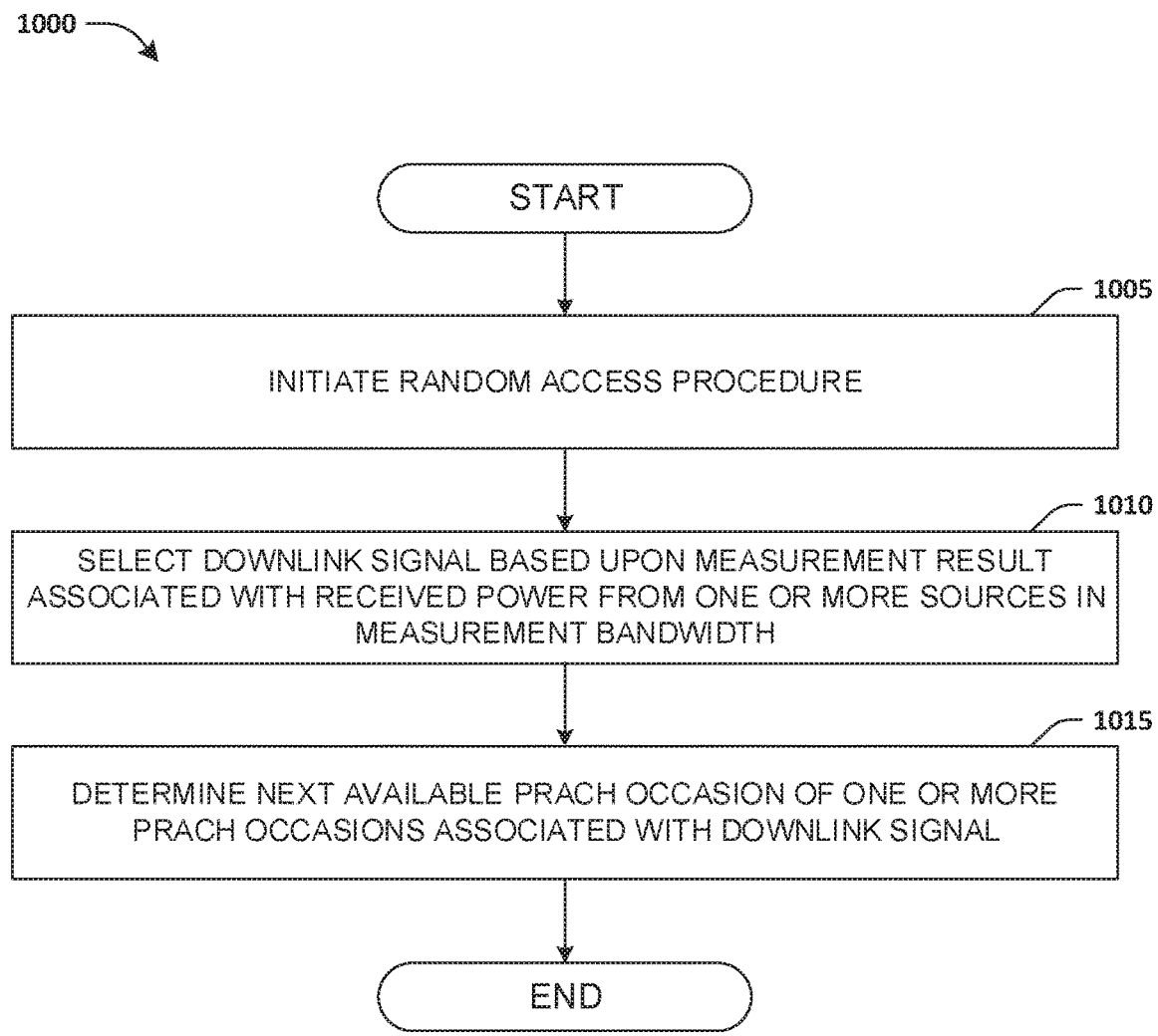
FIG. 10 is a flow chart according to one exemplary embodiment.

FIG. 10 is a flow chart 1000 according to one exemplary embodiment from the perspective of a UE. In step 1005, a random access procedure is initiated. In step 1010, a downlink signal is selected based upon a measurement result associated with received power from one or more sources in a measurement bandwidth. In step 1015, a next available PRACH occasion of one or more PRACH occasions associated with the downlink signal is determined. For example, the next available PRACH occasion is determined based upon the downlink signal and/or the one or more PRACH occasions associated with the downlink signal. In some examples, the next available PRACH occasion is selected from the one or more PRACH occasions associated with the downlink signal.

In the context of the embodiment illustrated in FIG. 10 and discussed above, the measurement result is associated with (and/or related to) received power from one or more resource elements that carry the downlink signal. In some examples, the measurement result is associated with (and/or related to) received power from one or more second sources, of the one or more sources, that carry the downlink signal, where the one or more second sources (and/or the one or more sources) are different than the one or more resource elements that carry the downlink signal.

In some examples, the UE selects the downlink signal from amongst downlink signals with RSRP values above (and/or equal to) a first threshold.

In some examples, the UE selects the downlink signal with an RSRP value above (and/or equal to) the first threshold from amongst downlink signals associated with measurement results above (and/or equal to) a second threshold, wherein the measurement results are associated with the measurement result (e.g., the measurement results are associated with a type of measurement associated with the measurement result).

In some examples, the UE selects the downlink signal with an RSRP value above (and/or equal to) the first threshold from amongst downlink signals associated with measurement results below (and/or equal to) a third threshold, wherein the measurement results are associated with the measurement result (e.g., the measurement results are associated with a type of measurement associated with the measurement result).

In some examples, the RSRP value is an SS-RSRP value and/or a CSI-RSRP value. In some examples, the first threshold is rsrp-ThresholdSSB (if the RSRP value is the SS-RSRP value) and/or rsrp-ThresholdCSI-RS (if the RSRP value is the CSI-RSRP value).

In some examples, the first threshold, the second threshold and/or the third threshold is configured by a network.

In some examples, the measurement result is associated with an SS-RSRQ, an NR carrier RSSI, a channel occupancy, a CSI-RSRQ and/or a CSI-RSSI.

In some examples, the downlink signal is a CSI-RS. In some examples, the downlink signal is an SSB.

In some examples, the UE may initiate the random access procedure on an NR-U cell. In some examples, the UE may initiate the random access procedure on a licensed cell.

Figure 11:
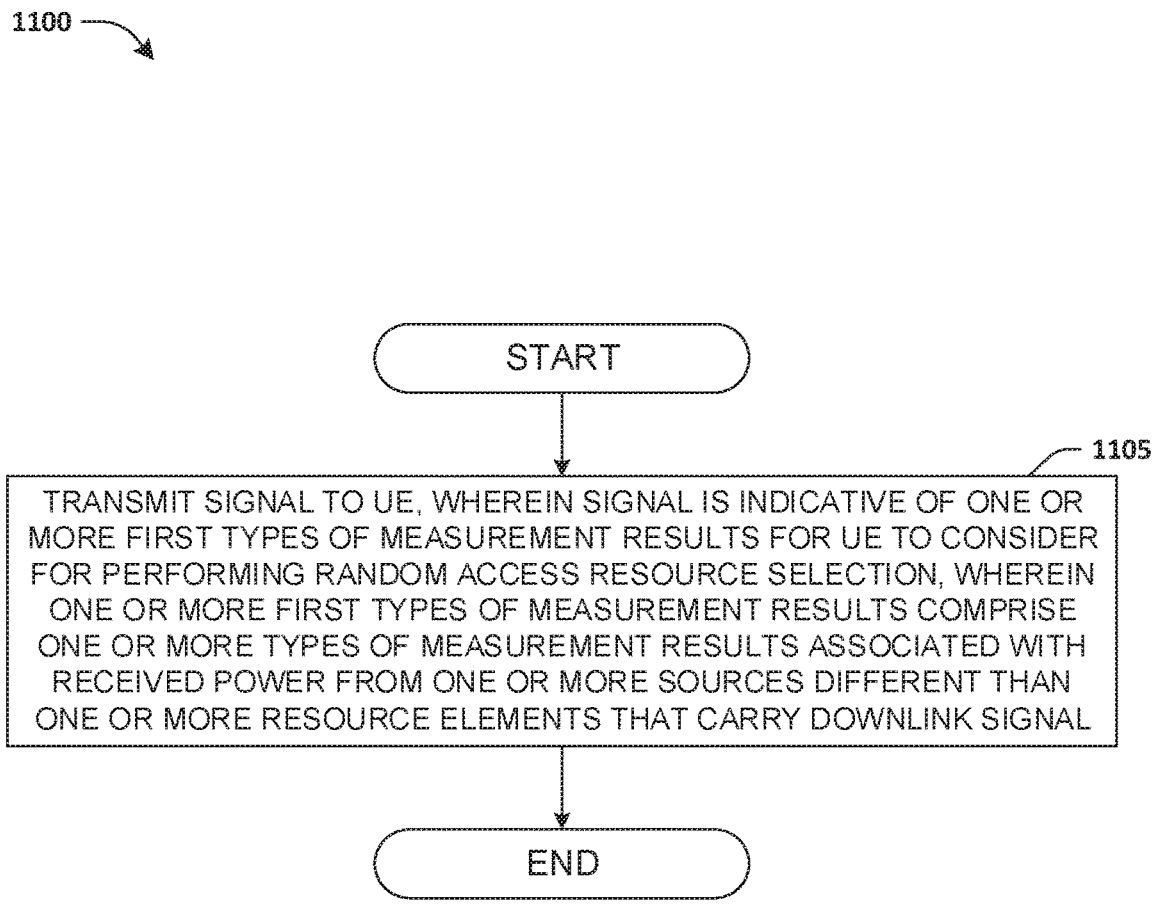
FIG. 11 is a flow chart according to one exemplary embodiment.

FIG. 11 is a flow chart 1100 according to one exemplary embodiment from the perspective of a network. In step 1105, a signal is transmitted to a UE. The signal is indicative of one or more first types of measurement results for the UE to consider for performing random access resource selection. The one or more first types of measurement results comprise one or more types of measurement results associated with received power from one or more sources different than one or more resource elements that carry a downlink signal.

Figure 12:
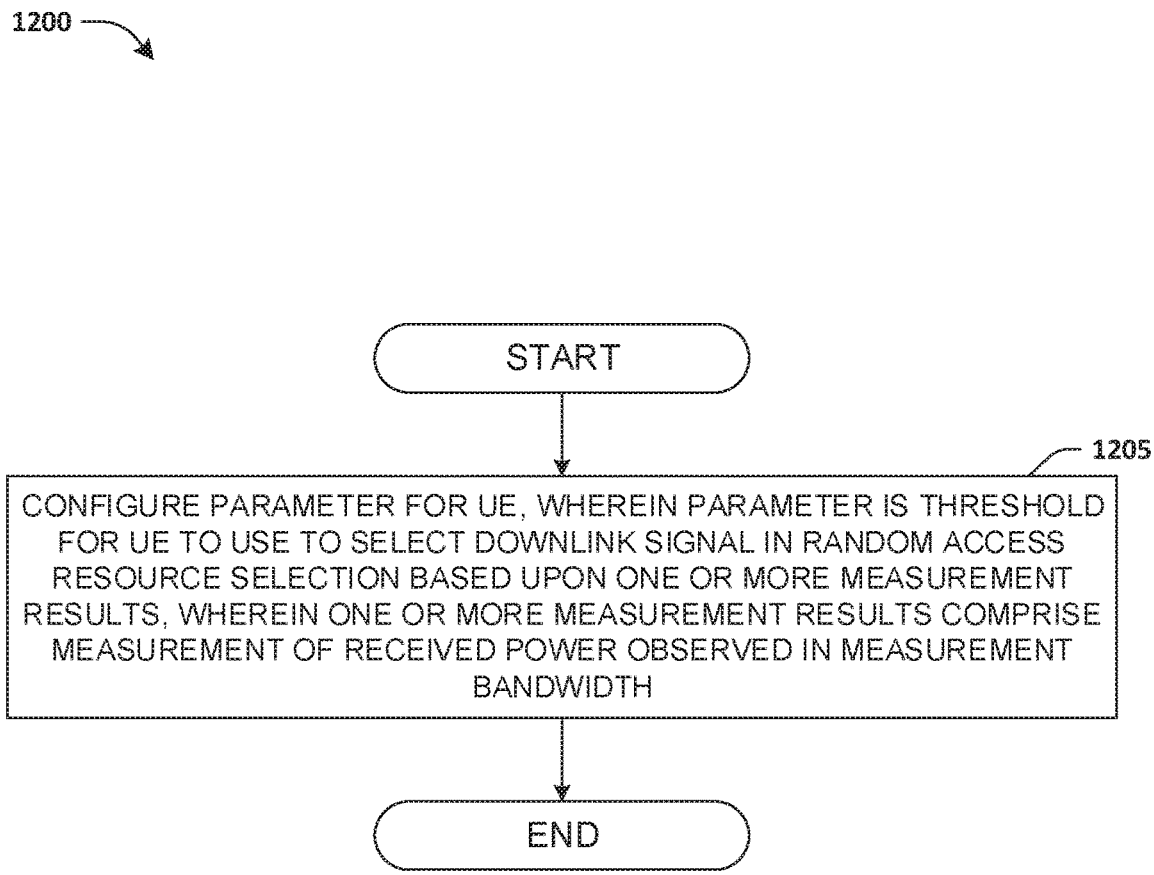
FIG. 12 is a flow chart according to one exemplary embodiment.

FIG. 12 is a flow chart 1200 according to one exemplary embodiment from the perspective of a network. In step 1205, a parameter is configured for a UE. The parameter is a threshold for the UE to use to select a downlink signal in a random access resource selection based upon one or more measurement results. The one or more measurement results comprise a measurement of received power observed in a measurement bandwidth.

In the context of the embodiment illustrated in FIG. 11 and FIG. 12, and discussed above, the one or more first types of measurement results are associated with (and/or comprise) an SS-RSRQ, an SS-RSRP, a CSI-RSRP, an NR carrier RSSI, a channel occupancy, a CSI-RSRQ and/or a CSI-RSSI. In some examples, the downlink signal is a CSI-RS. In some examples, the downlink signal is an SSB.

Figure 13:
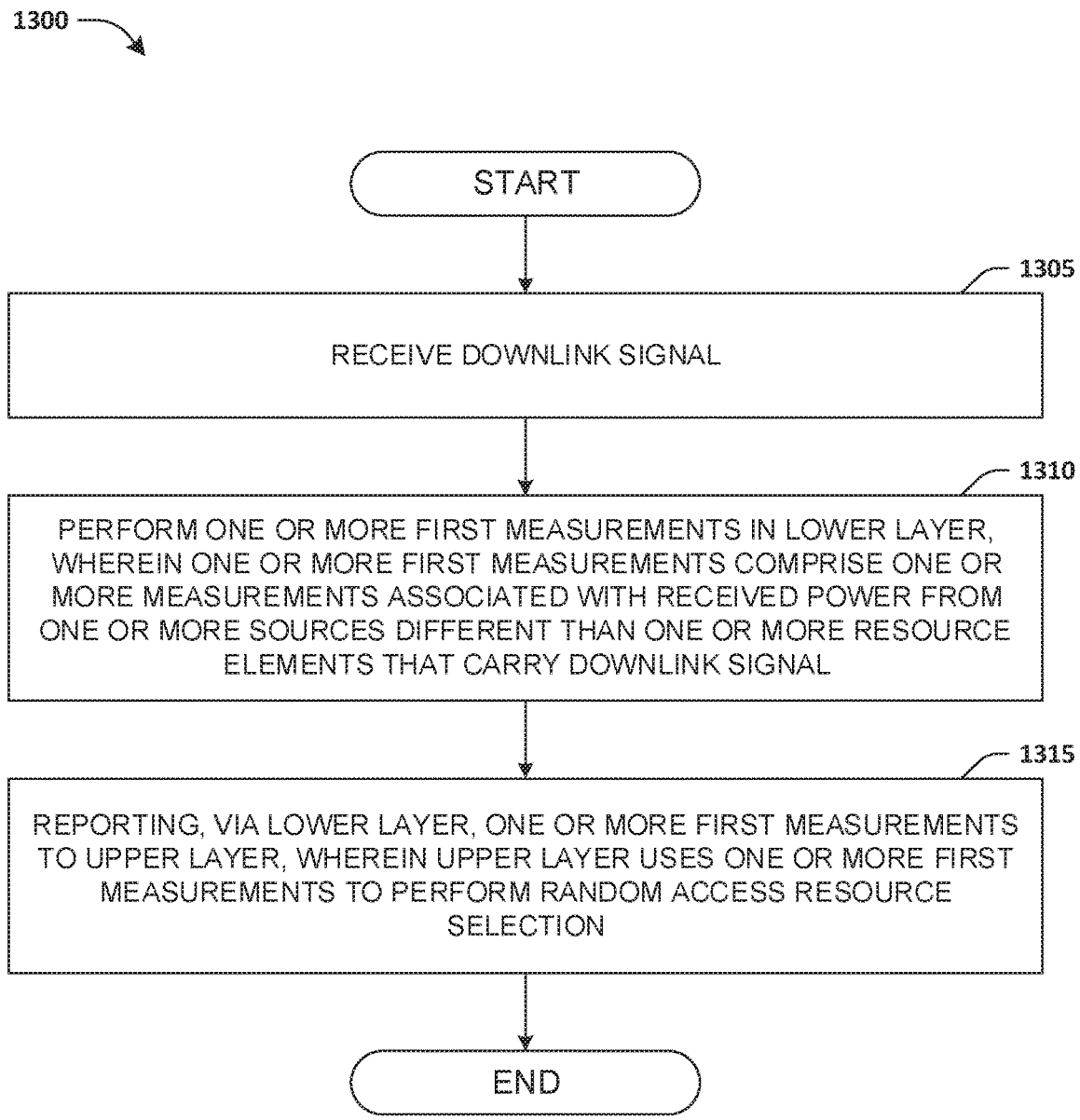
FIG. 13 is a flow chart according to one exemplary embodiment.

FIG. 13 is a flow chart 1300 according to one exemplary embodiment from the perspective of a UE. In step 1305, a downlink signal is received. In step 1310, one or more measurements are performed in a lower layer (of the UE). The one or more measurements may comprise one or more measurements associated with received power from one or more sources different than one or more resource elements that carry the downlink signal (e.g., the one or more measurements are performed based upon (and/or considering) the received power from the one or more sources). In step 1315, the one or more measurements are reported to an upper layer (of the UE), via the lower layer (e.g., the lower layer may report the one or more measurements to the upper layer). The upper layer may use the one or more measurements to perform random access resource selection.

In the context of the embodiment illustrated in FIG. 13, and discussed above, the lower layer is a physical layer (of the UE). In some examples, the upper layer is a MAC layer (of the UE). In some examples, the one or more measurements may comprise an SS-RSRQ, an SS-RSRP, a CSI-RSRP, an NR carrier RSSI, a channel occupancy, a CSI-RSRQ and/or a CSI-RSSI. In some examples, the downlink signal is a CSI-RS. In some examples, the downlink signal is an SSB.

In the context of the embodiments illustrated in FIGS. 10-13, and discussed above, the SS-RSRP may correspond to an average (e.g., a linear average) over one or more power contributions of one or more resource elements that carry one or more secondary SSs.

In some examples, the CSI-RSRP may correspond to an average (e.g., a linear average) over one or more power contributions of one or more resource elements that carry one or more CSI-RSs configured for one or more RSRP measurements within a measurement frequency bandwidth in one or more configured CSI-RS occasions.

In some examples, the NR carrier RSSI may correspond to an average (e.g., a linear average) of a total received power observed in one or more OFDM symbols of one or more measurement time resources, in a measurement bandwidth, over N number of resource blocks from one or more sources.

In some examples, the CSI-RSSI may correspond to an average (e.g., a linear average) of a total received power observed in one or more OFDM symbols of one or more measurement time resources, in a measurement bandwidth, over N number of resource blocks from one or more sources.

In some examples, the channel occupancy may correspond to a proportion (e.g., a percentage) of measurement samples that are associated with RSSI values above (and/or equal to) a threshold (e.g., a threshold RSSI) (e.g., the channel occupancy may correspond to a relationship of a total number of measurement samples associated with measurements of an exemplary downlink signal with a number of measurement samples corresponding to measurement samples that are associated with RSSI values above (and/or equal to) the threshold).

In some examples, the one or more sources may comprise one or more co-channel serving cells and/or one or more co-channel non-serving cells. In some examples, the one or more sources may comprise adjacent channel interference and/or thermal noise.

In some examples, the SS-RSRQ may correspond to a ratio of a product of N and the SS-RSRP to the NR carrier RSSI.

In some examples, the measurement bandwidth comprises at least the one or more resources elements that carry the downlink signal.

In some examples, the SS-RSRQ may correspond to a ratio of a product of N and the CSI-RSRP to the CSI-RSSI.

In some examples, the random access procedure is a contention based random access procedure. In some examples, the random access procedure is a contention free random access procedure. In some examples, the random access procedure is a random access procedure for beam failure recovery.

Figure 14:
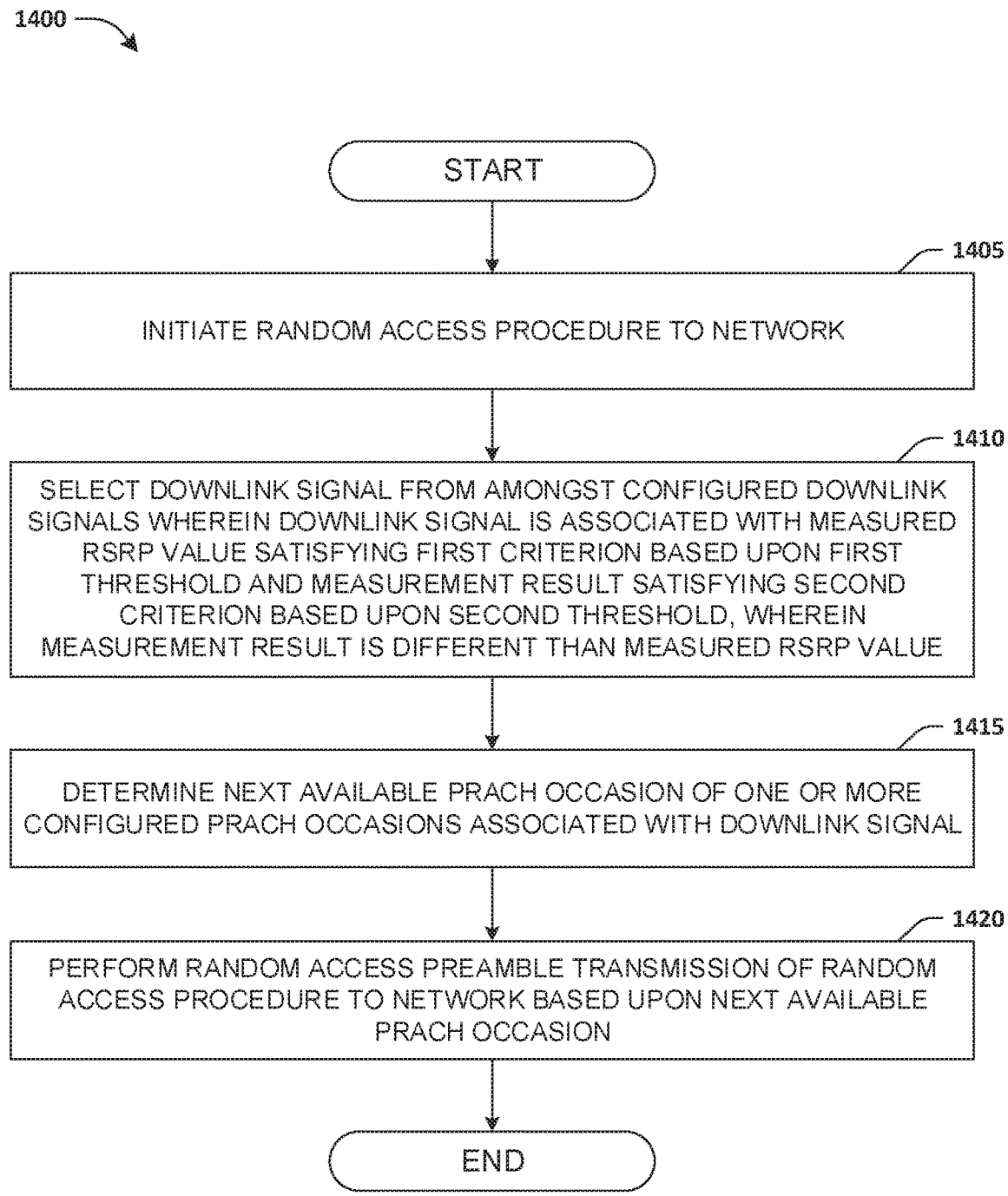
FIG. 14 is a flow chart according to one exemplary embodiment.

FIG. 14 is a flow chart 1400 according to one exemplary embodiment from the perspective of a UE. In step 1405, a random access procedure is initiated to a network. In step 1410, a downlink signal is selected from amongst configured downlink signals. The downlink signal is associated with a measured RSRP value satisfying a first criterion based upon a first threshold. The downlink signal is associated with a measurement result satisfying a second criterion based upon a second threshold. The measurement result is different than (and/or is not) the measured RSRP value. In step 1415, a next available PRACH occasion of one or more configured PRACH occasions associated with the downlink signal is determined. For example, the next available PRACH occasion is determined based upon the downlink signal and/or the one or more configured PRACH occasions associated with the downlink signal. In some examples, the next available PRACH occasion is selected from the one or more configured PRACH occasions associated with the downlink signal. In step 1420, a random access preamble transmission, of the random access procedure, to the network is performed based upon the next available PRACH occasion (e.g., a random access preamble is transmitted to the network based upon the next available PRACH occasion).

In the context of the embodiments illustrated in FIG. 14, and discussed above, the first criterion is satisfied based upon the measured RSRP value being above (and/or equal to) the first threshold (e.g., the first criterion is satisfied if the measured RSRP value is above (and/or equal to) the first threshold).

In some examples, the second criterion is satisfied based upon the measurement result being above (and/or equal to) the second threshold (e.g., the second criterion is satisfied if the measurement result is above (and/or equal to) the second threshold).

In some examples, the second criterion is satisfied based upon the measurement result being below (and/or equal to) the second threshold (e.g., the second criterion is satisfied if the measurement result is below (and/or equal to) the second threshold).

In some examples, the measurement result corresponds to (and/or comprises) an RSSI, an RSRQ, an SINR and/or a channel occupancy.

In some examples, the measurement result is associated with received power from one or more first sources, wherein the one or more first sources comprise one or more sources that carry the downlink signal.

In some examples, the downlink signal is a CSI-RS. In some examples, the downlink signal is an SSB. In some examples, the configured downlink signals is configured by the network. In some examples, the one or more configured PRACH occasions is configured by the network. In some examples, the first threshold is configured by the network. In some examples, the second threshold is configured by the network.

Figure 15:
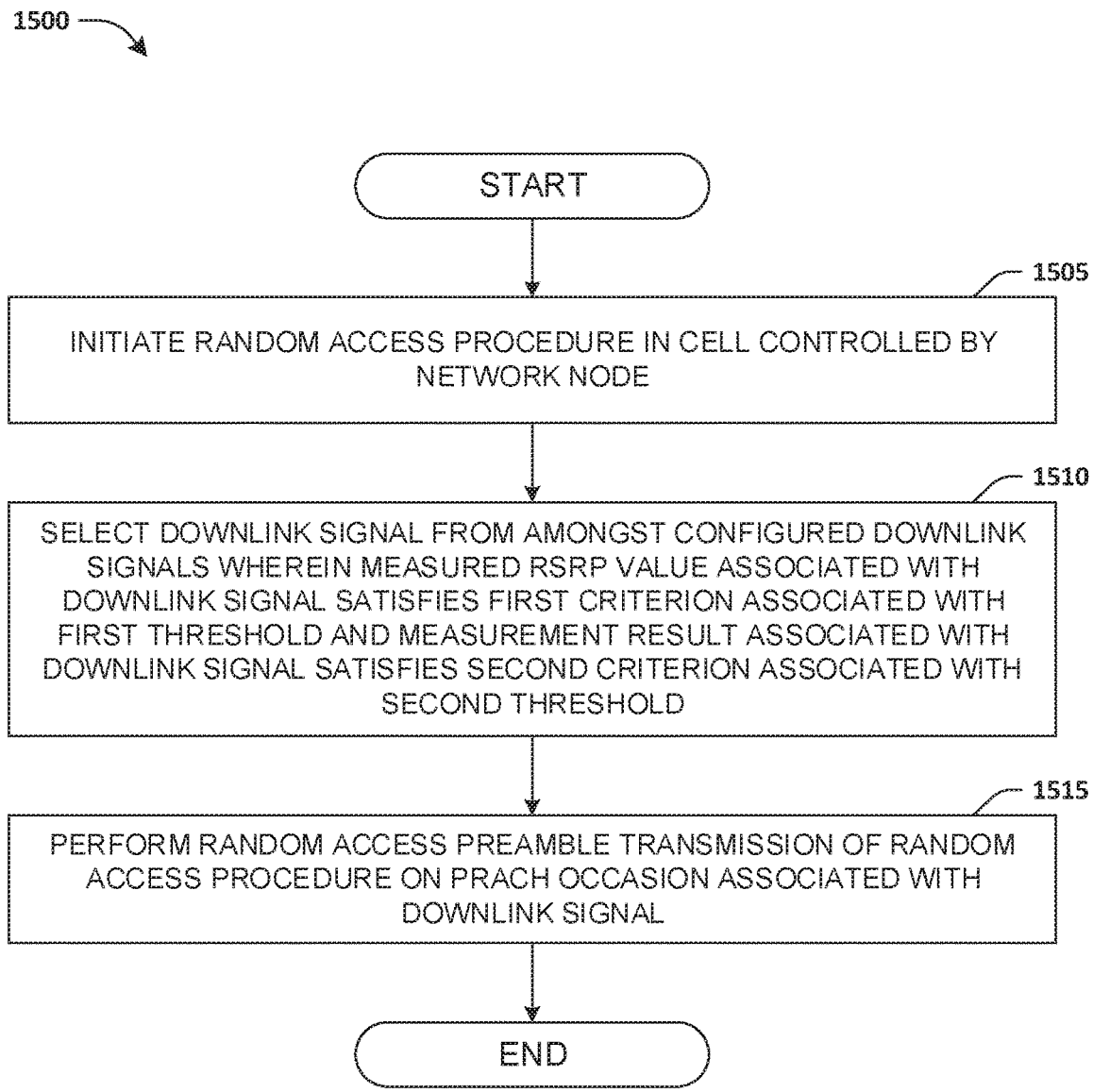
FIG. 15 is a flow chart according to one exemplary embodiment.

FIG. 15 is a flow chart 1500 according to one exemplary embodiment from the perspective of a UE. In step 1505, a random access procedure is initiated in a cell controlled by a network node. In step 1510, a downlink signal is selected from amongst configured downlink signals. A measured RSRP value associated with the downlink signal satisfies a first criterion associated with a first threshold. A measurement result associated with the downlink signal satisfies a second criterion associated with a second threshold. In step 1515, a random access preamble transmission of the random access procedure is performed on a PRACH occasion associated with the downlink signal.

Referring back to FIGS. 3 and 4, in one exemplary embodiment of a UE, the device 300 includes a program code 312 stored in the memory 310. The CPU 308 may execute program code 312 to enable the UE (i) to initiate a random access procedure in a cell controlled by a network node, (ii) to select a downlink signal from amongst configured downlink signals, wherein a measured RSRP value associated with the downlink signal satisfies a first criterion associated with a first threshold and a measurement result associated with the downlink signal satisfies a second criterion associated with a second threshold, and (iii) to perform a random access preamble transmission of the random access procedure on a PRACH occasion associated with the downlink signal. Furthermore, the CPU 308 can execute the program code 312 to perform some and/or all of the above-described actions and steps and/or others described herein.

In the context of the embodiments illustrated in FIG. 15, and discussed above, the first criterion is satisfied based upon the measured RSRP value being above the first threshold.

In some examples, the second criterion is satisfied based upon the measurement result being above the second threshold.

In some examples, the second criterion is satisfied based upon the measurement result being below the second threshold.

In some examples, the measurement result is associated with an RSSI, an RSRQ, an SINR and/or a channel occupancy.

In some examples, the measurement result is associated with received power from a plurality of sources comprising a first source that carries the downlink signal.

In some examples, the downlink signal is an SSB or a CSI-RS.

In some examples, the configured downlink signals are configured by the network node.

In some examples, an association between the PRACH occasion and the downlink signal is configured by the network node.

In some examples, the first threshold and/or the second threshold are configured by the network node.

In some examples, the cell operates in an unlicensed spectrum.

Figure 16:
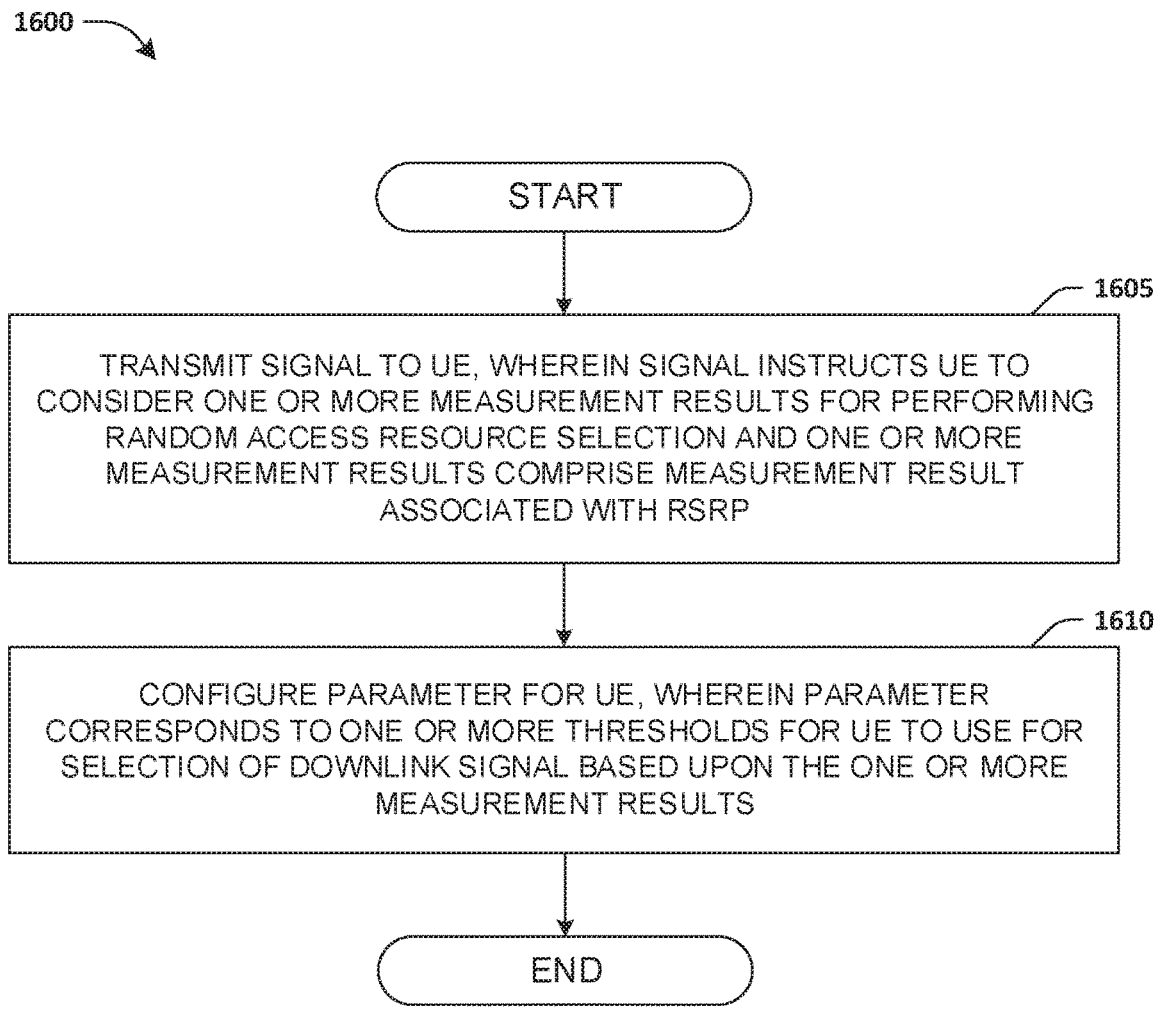
FIG. 16 is a flow chart according to one exemplary embodiment.

FIG. 16 is a flow chart 1600 according to one exemplary embodiment from the perspective of a network. In step 1605, a signal is transmitted to a UE. The signal instructs and/or causes the UE to consider one or more measurement results for performing random access resource selection. For example, the signal may be indicative of the one or more measurement results for the UE to consider for performing random access resource selection. The one or more measurement results comprise a measurement result associated with RSRP. In step 1610, a parameter is configured for the UE. The parameter corresponds to (and/or is indicative of) one or more threshold for the UE to use for selection of a downlink signal based upon the one or more measurement results.

Referring back to FIGS. 3 and 4, in one exemplary embodiment of a network, the device 300 includes a program code 312 stored in the memory 310. The CPU 308 may execute program code 312 to enable the network (i) to transmit a signal to a UE, wherein the signal instructs and/or causes the UE to consider one or more measurement results for performing random access resource selection and the one or more measurement results comprise a measurement result associated with RSRP, and (ii) to configure a parameter for the UE, wherein the parameter corresponds to one or more thresholds for the UE to use for selection of a downlink signal based upon the one or more measurement results. Furthermore, the CPU 308 can execute the program code 312 to perform some and/or all of the above-described actions and steps and/or others described herein.

In the context of the embodiments illustrated in FIG. 16, and discussed above, the one or more measurement results are associated with an RSSI, an RSRQ, an SINR and/or a channel occupancy.

It is appreciated that applying one or more of the techniques presented herein may result in one or more benefits including, but not limited to, a decrease in transmission delay in a random access procedure for a UE.

A communication device (e.g., a UE, a base station, a network node, etc.) is provided, wherein the communication device may comprise a control circuit, a processor installed in the control circuit and/or a memory installed in the control circuit and coupled to the processor. The processor is configured to execute a program code stored in the memory to perform method steps illustrated in one or more of FIGS. 10-16. Furthermore, the processor may execute the program code to perform some and/or all of the above-described actions and steps and/or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE), comprising:
    initiating a random access procedure in a cell controlled by a network node;
    selecting a specific Synchronization Signal Block (SSB) from amongst configured SSBs, wherein:
        a measured Reference Signal Received Power (RSRP) value associated with the specific SSB satisfies a first criterion associated with a first threshold; and
        a measurement result associated with the specific SSB satisfies a second criterion associated with a second threshold; and
    performing a random access preamble transmission of the random access procedure on a Physical Random Access Channel (PRACH) occasion associated with the specific SSB associated with both the measured RSRP value satisfying the first criterion and the measurement result satisfying the second criterion.

2. The method of claim 1, wherein the first criterion is satisfied based upon the measured RSRP value being above the first threshold.

3. The method of claim 1, wherein the second criterion is satisfied based upon the measurement result being above the second threshold.

4. The method of claim 1, wherein the second criterion is satisfied based upon the measurement result being below the second threshold.

5. The method of claim 1, wherein the measurement result is associated with at least one of:
    a Received Signal Strength Indicator (RSSI);
    a Signal-to-Noise and Interference Ratio (SINR); or
    a channel occupancy.

6. The method of claim 1, wherein the measurement result is associated with received power from a plurality of sources comprising a first source that carries the specific SSB.

7. The method of claim 1, wherein the measurement result is associated with at least one of:
    a Signal-to-Noise and Interference Ratio (SINR); or
    channel occupancy.

8. The method of claim 1, wherein:
    the configured SSBs are configured by the network node; and
    an association between the PRACH occasion and the specific SSB is configured by the network node.

9. The method of claim 1, wherein the first threshold and the second threshold are configured by the network node.

10. The method of claim 1, wherein the cell operates in an unlicensed spectrum.

11. A method for a network, comprising:
    transmitting a signal to a User Equipment (UE), wherein:
        the signal instructs the UE to consider a plurality of measurement results for performing random access resource selection; and
        the plurality of measurement results comprise a measurement result associated with Reference Signal Received Power (RSRP); and configuring a plurality of thresholds for the UE to use for selection of a specific Synchronization Signal Block (SSB) based upon the plurality of measurement results, wherein the specific SSB is associated with both:
- a measured RSRP value satisfying a first criterion associated with a first threshold of the plurality of thresholds; and
- a second measurement result satisfying a second criterion associated with a second threshold of the plurality of thresholds.

12. The method of claim 11, wherein the second measurement results is associated with at least one of:
- a Received Signal Strength Indicator (RSSI);
- a Reference Signal Received Quality (RSRQ);
- a Signal-to-Noise and Interference Ratio (SINR); or
- a channel occupancy.

13. A communication device, comprising:
- a processor; and
- memory comprising processor-executable instructions that when executed by the processor cause performance of operations, the operations comprising:
  - initiating a random access procedure in a cell controlled by a network node;
  - selecting a specific Synchronization Signal Block (SSB) from amongst configured SSBs, wherein:
    - a measured Reference Signal Received Power (RSRP) value associated with the specific SSB satisfies a first criterion associated with a first threshold; and
    - a measurement result associated with the specific SSB satisfies a second criterion associated with a second threshold; and
  - performing a random access preamble transmission of the random access procedure on a Physical Random Access Channel (PRACH) occasion associated with the specific SSB associated with both the measured RSRP value satisfying the first criterion and the measurement result satisfying the second criterion.

14. The communication device of claim 13, wherein the first criterion is satisfied based upon the measured RSRP value being above the first threshold.

15. The communication device of claim 13, wherein the second criterion is satisfied based upon the measurement result being above the second threshold.

16. The communication device of claim 13, wherein the second criterion is satisfied based upon the measurement result being below the second threshold.

17. The communication device of claim 13, wherein the measurement result is associated with at least one of:
- a Received Signal Strength Indicator (RSSI);
- a Reference Signal Received Quality (RSRQ);
- a Signal-to-Noise and Interference Ratio (SINR); or
- channel occupancy.

18. The communication device of claim 13, wherein the measurement result is associated with received power from a plurality of sources comprising a first source that carries the specific SSB.

19. The communication device of claim 13, wherein the measurement result is associated with at least one of:
- a Signal-to-Noise and Interference Ratio (SINR); or
- channel occupancy.

20. The communication device of claim 13, wherein:
- the configured SSBs are configured by the network node; and
- an association between the PRACH occasion and the specific SSB is configured by the network node.

* * * * *